(12) United States Patent
Kure et al.

(10) Patent No.: US 10,306,268 B2
(45) Date of Patent: May 28, 2019

(54) INFORMATION PROCESSING DEVICE AND METHOD

(75) Inventors: Yoshinobu Kure, Kanagawa (JP);
Hideaki Murayama, Kanagawa (JP);
Tamotsu Munakata, Kanagawa (JP);
Chihiro Fujita, Kanagawa (JP);
Osamu Yoshimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 272 days.

(21) Appl. No.: 13/183,843

(22) Filed: Jul. 15, 2011

(65) Prior Publication Data

US 2012/0039194 A1    Feb. 16, 2012

(30) Foreign Application Priority Data

Aug. 12, 2010    (JP) .................................. 2010-180945

(51) Int. Cl.
| | |
|---|---|
| *H04N 21/43* | (2011.01) |
| *H04N 19/63* | (2014.01) |
| *H04N 19/65* | (2014.01) |
| *H04N 19/30* | (2014.01) |
| *H04N 19/60* | (2014.01) |
| *H04N 19/124* | (2014.01) |
| *H04N 19/152* | (2014.01) |
| *H04N 21/44* | (2011.01) |
| *H04N 21/6375* | (2011.01) |
| *H04N 21/6437* | (2011.01) |
| *H04L 29/06* | (2006.01) |
| *H04L 1/00* | (2006.01) |

(52) U.S. Cl.
CPC ........... *H04N 19/65* (2014.11); *H04N 19/124* (2014.11); *H04N 19/152* (2014.11); *H04N 19/30* (2014.11); *H04N 19/60* (2014.11); *H04N 19/63* (2014.11); *H04N 21/4302* (2013.01); *H04N 21/44004* (2013.01); *H04N 21/6375* (2013.01); *H04N 21/6437* (2013.01); *H04L 1/004* (2013.01); *H04L 65/601* (2013.01)

(58) Field of Classification Search
CPC combination set(s) only.
See application file for complete search history.

(56) References Cited

U.S. PATENT DOCUMENTS

| 7,907,785 B2 | 3/2011 | Fukuhara et al. | |
|---|---|---|---|
| 2002/0009054 A1* | 1/2002 | Suzuki et al. | 370/252 |

(Continued)

FOREIGN PATENT DOCUMENTS

JP    4371120    9/2009

OTHER PUBLICATIONS

Office Action dated Apr. 24, 2014 in Japanese Patent Application No. 2010-180945.

*Primary Examiner* — Marcus Smith
(74) *Attorney, Agent, or Firm* — Chip Law Group

(57) ABSTRACT

There is provided an information processing device including an adjustment unit that adjusts respective lengths of delay times, which delay data transmission, for a plurality of different delay elements regarding the data transmission, so as to match with the longest delay time of the plurality of delay times or a predetermined time equal to or more than the longest delay time, and a setting unit that sets the respective plurality of delay times of which the lengths are adjusted by the adjustment unit in a processing unit which performs a process for the data transmission.

12 Claims, 21 Drawing Sheets

(56) References Cited

U.S. PATENT DOCUMENTS

| | | | |
|---|---|---|---|
| 2007/0091815 A1* | 4/2007 | Tinnakornsrisuphap | H04N 21/2383 370/252 |
| 2008/0273520 A1* | 11/2008 | Kim et al. | 370/345 |
| 2009/0295988 A1* | 12/2009 | Kohno | H04N 21/23436 348/441 |
| 2009/0310493 A1* | 12/2009 | Nogami | H04L 1/205 370/252 |
| 2010/0002692 A1* | 1/2010 | Bims | H04L 1/0009 370/389 |
| 2010/0177776 A1* | 7/2010 | Crinon | H04L 12/6418 370/394 |
| 2011/0069625 A1* | 3/2011 | Michaelis et al. | 370/252 |
| 2011/0170613 A1 | 7/2011 | Tanaka | |

* cited by examiner

INFORMATION PROCESSING DEVICE AND METHOD

BACKGROUND

The present disclosure relates to an information processing device, an information processing method, and a program, and more particularly to an information processing device, an information processing method, and a program, capable of suppressing deterioration in quality of content.

In recent years, there has been increasing demand for the execution of medium reference signal synchronization (so-called GENLOCK synchronization) and the transmission of multimedia data with a short delay via the Internet, LAN (Local Area Network), or other transmission paths.

For example, there is a system in which in a broadcasting station, a camera is connected to a control unit thereof (so-called CCU (Camera Control Unit)) via an HD-SDI (High Definition Serial Digital Interface) cable and non-compression synchronization transmission is performed. In recent years, the HD-SDI cable in the system has been replaced with an Ethernet (registered trademark) cable, and the transmission has been performed while executing the GENLOCK synchronization using IP packets on the Ethernet.

In the case of performing IP transmission of multimedia data for this purpose, usability equal to that in transmission via the HD-SDI cable is demanded, and thus, for example, there are requests for high accuracy GENLOCK synchronization and short delay transmission equal to or less than the video frame interval.

In order to deal with these requests, there has been proposed a method in which encoding is performed for several lines of each picture of the moving images by the wavelet transform as one encoding block (line block) (for example, refer to Japanese Patent No. 4371120).

In this method, the encoding can start without waiting for all of the data in a picture to be input. For this reason, when the encoded data generated is transmitted via a network and is decoded in a reception side, a decoding process can start before all of the data in the picture are received. In other words, if the network propagation delay is sufficiently short, it is possible to transmit moving images in real-time (instantly) with a delay equal to or less than the frame interval.

In the data transmission, in order to perform stable data transmission without failure of the system, a time for error correction or packet retransmission is set as a delay time. As such, an element demanding securing of a delay time such as a waiting time of a process or buffering of data is referred to as a delay element.

Generally, there are many cases where a plurality of delay elements exists in the data transmission. With regard to these delay elements, a delay time is secured in a device of the reception side, however, in the case where a plurality of delay elements exists as described above, the delay time in the device of the reception side is set to the longest time (or more) of delay times for the respective delay elements.

In other words, even if a delay time for a delay element having a delay time shorter than the delay time set in the device of the reception side is expanded to a time equal to the set delay time, the delay time set in the reception side does not vary. In other words, a delay time in the overall data transmission is not increased.

SUMMARY

However, in the method in the related art, since the delay times for the above-described respective delay elements are set independently from each other, there is a concern that a process related to the delay element for which the delay time is set to be short is performed in a state where the delay time is set to be unnecessarily short, and, after the process, an unnecessary waiting time for which no process is performed may occur. In other words, there is a problem in that quality of content may be unnecessarily deteriorated due to the data transmission.

It is desirable to enable wasted delay time to be reduced by using extra time in each process to improve image quality or transmission quality.

According to an embodiment, there is provided an information processing device including an adjustment unit that adjusts respective lengths of delay times, which delay data transmission, for a plurality of different delay elements regarding the data transmission, so as to match with the longest delay time of the plurality of delay times or a predetermined time equal to or more than the longest delay time; and a setting unit that sets the respective plurality of delay times of which the lengths are adjusted by the adjustment unit in a processing unit which performs a process for the data transmission.

The delay times may be QoS control process times in the data transmission, and the adjustment unit may adjust the lengths of the respective delay times so as to match with the longest QoS control process request time of the QoS control process request times which are requested as the QoS control process times or a predetermined time equal to or more than the longest QoS control process request time.

The QoS control process times may include a redundant encoding block reception waiting time which is a time when a leading packet to an end packet of a redundant encoding block are received; a retransmitted packet waiting time which is a time to wait for retransmitted packets; and a network jitter handling buffer time for absorbing network jitter.

The setting unit may set the retransmitted packet waiting time in a retransmission processing unit which retransmits the packets, and set the network jitter handling buffer time in a holding unit which temporarily holds the transmitted data.

The information processing device may further include a parameter setting unit that sets parameters for the QoS control process in a data transmission side using a transmission quality request which is a request for transmission quality in the data transmission and the redundant encoding block reception waiting time.

The data may be encoded in a transmission source, the obtained encoded data may be transmitted, and the encoded data may be decoded in a transmission destination. At this time, the delay times may include a variable compression encoding delay request time which is necessary when the encoded data which is generated through a rate control in the encoding is transmitted through smoothing. In addition, the information processing device may further include a parameter setting unit that sets encoding parameters including a buffer size of the encoding using an image quality request which is a request for image quality of the data and the variable compression encoding delay request time.

The information processing device may further include a reception unit that receives an image quality request which is a request for image quality of the data and a transmission quality request which is a request for transmission quality of the data transmission. In this case, the adjustment unit may set delay request times requested as the respective delay times based on the image quality request and the transmission quality request received by the reception unit.

The information processing device may further include an output unit that displays a GUI assisting an input of the image quality request and the transmission quality request received by the reception unit.

In the data transmission which is performed from a plurality of transmission devices to one reception device, the adjustment unit may adjust the delay times for each transmission device, and adjust the delay times such that the respective delay times in the overall data transmissions are aligned between the transmission devices.

According to another embodiment, there is provided an information processing method of an information processing device including enabling an adjustment unit of the information processing device to adjust respective lengths of delay times, which delay data transmission, for a plurality of different delay elements regarding the data transmission, so as to match with the longest delay time of the plurality of delay times or a predetermined time equal to or more than the longest delay time; and enabling a setting unit of the information processing device to set the respective plurality of delay times of which the lengths are adjusted in a processing unit which performs a process for the data transmission.

According to still another embodiment, there is provided a program enabling a computer, which performs data transmission, to function as an adjustment unit that adjusts respective lengths of delay times, which delay data transmission, for a plurality of different delay elements regarding the data transmission so as to match with the longest delay time of the plurality of delay times or a predetermined time equal to or more than the longest delay time; and a setting unit that sets the respective plurality of delay times of which the lengths are adjusted by the adjustment unit in a processing unit which performs a process for the data transmission.

According to the embodiments, respective lengths of delay times, which delay data transmission, for a plurality of different delay elements regarding the data transmission, are adjusted so as to match with the longest delay time of the plurality of delay times or a predetermined time equal to or more than the longest delay time, and the respective plurality of delay times of which the lengths are adjusted is set in a processing unit which performs a process for the data transmission.

According to the embodiments of the present disclosure, data can be transmitted. Particularly, it is possible to suppress deterioration in the quality of content.

DETAILED DESCRIPTION OF EMBODIMENTS

Hereinafter, embodiments of the present disclosure will be described. The description will be made in the following order.

1. FIRST EMBODIMENT (TRANSMISSION SYSTEM)
2. SECOND EMBODIMENT (TRANSMISSION SYSTEM)
3. THIRD EMBODIMENT (TRANSMISSION SYSTEM)
4. FOURTH EMBODIMENT (PERSONAL COMPUTER)

1. First Embodiment

Outline of Transmission System

Figure 1:
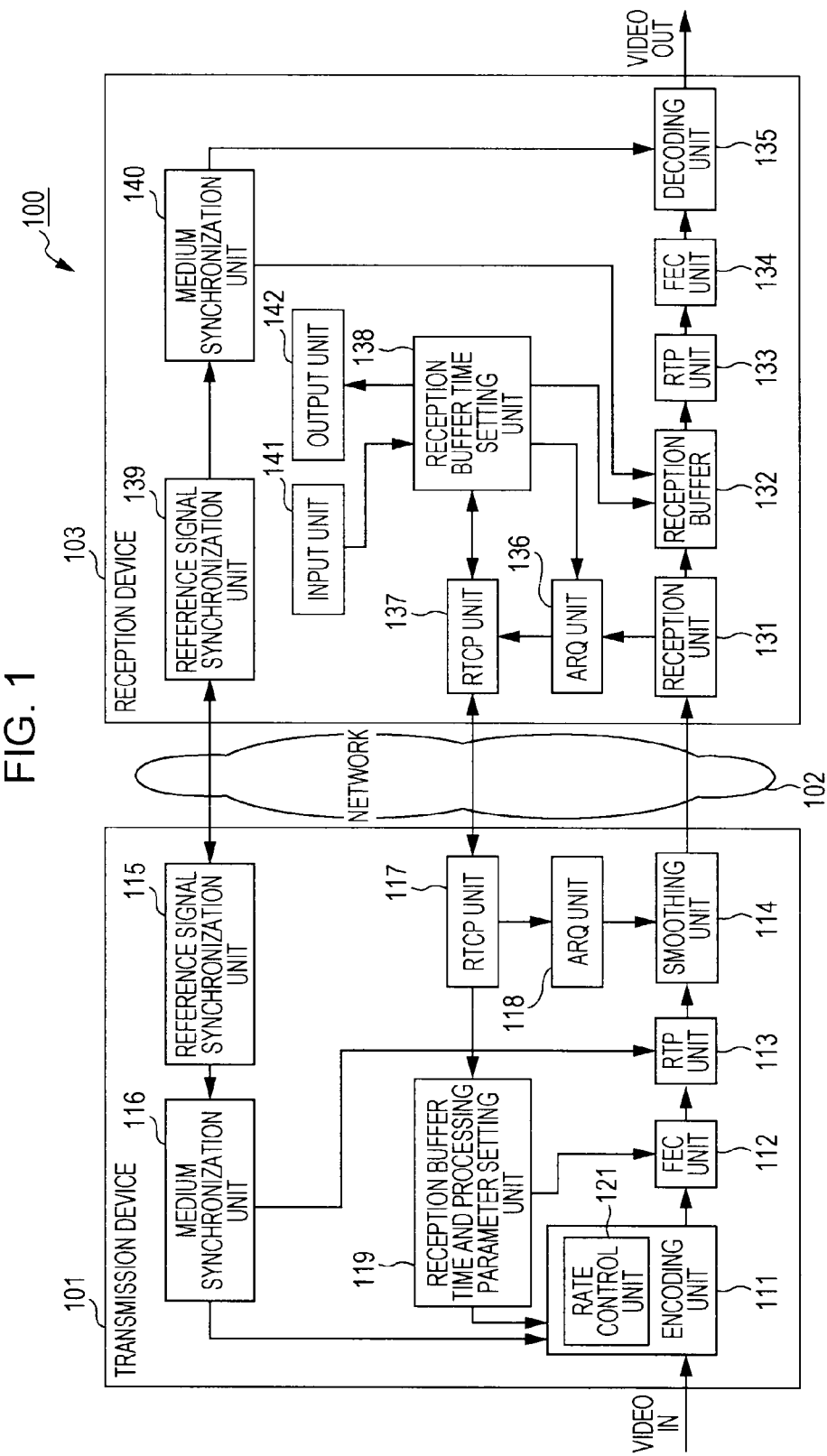
FIG. 1 is a block diagram illustrating a main configuration example of a transmission system according to an embodiment of the present disclosure.

FIG. 1 is a block diagram illustrating a main configuration example of a transmission system according to an embodiment of the present disclosure. A transmission system 100 is a system which transmits in real-time (instantly) image data (video data (VIDEO IN)) which is input to a transmission device 101 to a reception device 103 via a network 102 which is a general transmission path such as the Internet or LAN, and outputs the image data from the reception device 103 (VIDEO OUT).

The transmission device 101 sequentially encodes image data of moving images which are input from the external input terminal "VIDEO IN" without waiting for all data to be input, and transmits packets of the encoded data generated to the reception device 103 via the network 102.

The network 102 is a general IP packet network such as, for example, the Internet or LAN. Via the network 102, the data transmission between the transmission device 101 and the reception device 103 is not only performed but other data transmissions are also performed.

The reception device 103 receives the packets transmitted from the transmission device 101, sequentially decodes the encoded data obtained, and outputs image data for the decoded images from the external output terminal "VIDEO OUT". In addition, the reception device 103 outputs the image data at timings synchronized with sampling frequencies of the image data input to the transmission device 101. In other words, the image data is output from the reception device 103 at the same frame rate as when the image data is input to the transmission device 101. The transmission system 100 performs the data transmission to be in line with the output timings.

In recent years, there has been increasing demand for the execution of medium reference signal synchronization (so-called GENLOCK synchronization) and the transmission of multimedia data with a short delay via a general transmission path such as the Internet or LAN (Local Area Network).

For example, in the related art, there is a system in which in a broadcasting station, a camera is connected to a control unit thereof (so-called CCU) via an HD-SDI cable, and non-compression synchronization transmission is performed therebetween. Recently, the HD-SDI cable in the system has been replaced with an Ethernet cable, and the transmission has been performed while executing the GENLOCK synchronization using IP packets on the Ethernet.

In the case of performing IP transmission of multimedia data for this purpose, usability equal to that in transmission via the HD-SDI cable is demanded. Thereby, there are requests for high accuracy GENLOCK synchronization, and short delay transmission equal to or less than the video frame interval.

In order to deal with these requests, Japanese Patent No. 4371120 has proposed a method in which encoding is performed by treating several lines of each picture of the moving images as one encoding block (line block). In this method, the transmission device 101 can start the encoding without waiting for all of the data in a picture to be input. Further, the transmission device 101 can sequentially transmit the encoded data obtained by the encoding to the reception device 103 via the network 102.

The reception device 103 can start decoding before all of the data in the picture is received. In other words, if a network propagation delay is sufficiently short, it is possible to transmit moving images in real-time with a delay equal to or less than the frame interval (transmission of data which can be output from the reception device 103 at the frame rate where the data is input to the transmission device 101).

The encoding process of moving images includes a CBR (Constant Bit Rate) method in which encoding is performed at a constant data rate at a short time interval such as a frame or a line block, and a VBR (Variable Bit Rate) method in which an average data rate is constant at a long time interval but a data rate is varied at a short time interval.

In the case of transmitting compressed stream data in the VBR method, a control is performed such that the data does not exceed the maximal bucket size of a token bucket in the encoding process by using the token bucket or the like described in ITU-T Y.1221 and performing a smoothing process. At this time, the maximal burst (instant) data size in the encoding process is limited depending on the maximal bucket size.

In the case of the VBR method, generally, many pieces of data can be allocated to parts having high image complexity, or parts having low compression efficiency such as scenes including violent movements. For this reason, generally, the VBR method has the compression efficiency higher than the CBR method. In other words, typically, the VBR method has higher image quality than the CBR method in a case of the same average data rate.

As the maximal bucket size in the token bucket is increased, the image quality is improved, however, in a case of considering synchronization reproduction after the stream transmission, a delay time up to the synchronization reproduction is lengthened. Hereinafter, a delay time resulting from the smoothing process in the case of performing the encoding process in the VBR method is referred to as a variable compression encoding delay time.

As an Internet technique suitable for the real-time transmission as described above, there is an RTP (Real-time Transport Protocol) defined in IETF RFC 3550. In the data transmission using the RTP, a time stamp is added to a packet as time information, a time relationship between the transmission side and the reception side is grasped using the time stamp, and thus reproduction can be performed by performing synchronization without being influenced by delay fluctuation (jitter) in the packet transmission and the like.

However, the RTP does not guarantee real-time data transmission. For example, setting or management of priority of packet delivery, or the like is not included within the scope of transport service provided by the RTP. Therefore, there is a possibility that delivery delay or packet loss occurs in the RTP packets in the same manner as other protocol packets. However, even if the delivery delay or the data loss occurs, the reception device 103 can reproduce data using only arriving packets within an expected time. Video or audio data can be reproduced to a degree even if more or less data loss occurs.

In addition, packets delivered with a delay or packets in which errors occur are discarded by the reception device 103. In other words, although high quality data is delivered, there is a problem in that the reception device 103 does not sufficiently reproduce the high quality data due to packet loss or errors. It is said that the probability of error occurrence is $10^{-5}$ or more in a wired section and $10^{-3}$ or more in a wireless section. Thus, the use of the RTP in such a state leads to low reliability in maintaining quality of the transmitted media.

In contrast, there is a method for making a request for retransmission and sending retransmitted packets using a TCP (Transmission Control Protocol) having high reliability in the transmission of data. However, the TCP is reasonably resilient to errors, but it has low throughput and long delays. For this reason, there is a problem in that arrival of the retransmitted packets is performed out of line with the reproduction time.

As a method of improving reliability in the data transmission using the RTP, there is a forward error correction coding (ECC) method (so-called FEC (Forward Error Correction) method) in which the reliability can be improved by performing redundant encoding for data.

In the FEC method, a plurality of packets is designated as one FEC block, and the redundant encoding is performed using an error correction code such as the Reed-Solomon (RS) code or the like. For example, if (n, k) RS code is used and the number of original packets is k, it is possible to generate (n-k) redundant packets (where n>k). In this case, the transmission device 101 transmits a total of n packets, thereby the reception device 103 receives k packets of the n packets, and thus it is possible to recover k original packets through the RS decoding process.

When the redundant encoding is performed using the FEC method, the recovery performance for the packet loss depends on the FEC block original data unit and the number of redundant packets (n-k). Particularly, the recovery performance for loss in consecutive packets (so-called burst packet loss) on a data series, which occurs in the course of the data transmission via the network, has a close relation to the FEC block original data unit. Typically, as the FEC block original data unit is increased, the recovery performance for the burst packet loss is improved.

However, if the FEC block original data unit is increased, a block size (data amount) necessary to perform the FEC encoding process and decoding process becomes large. An accumulation amount of data necessary for the process, that is, a waiting time is increased accordingly, and thus there is a problem in that the delay time is increased. The delay time necessary for the FEC encoding process or the FEC decoding process is referred to as a redundant encoding block reception waiting time.

As another method for improving reliability of the data transmission, there is an automatic retransmission method, a so-called ARQ (Auto Repeat Request) method. The ARQ method is a method in which the reception device 103 detects lost packets using sequence numbers of RTP packets, and requests the transmission device 101 to retransmit the lost packets. As a method of expanding the ARQ method, there is a method in which the retransmission request is made again in the case where the reception device 103 does not receive retransmitted packets for a specific time with regard to the packet loss.

In the case of using this method, as a retransmitted packet waiting time is set to be large in the reception device 103, the recovery performance is improved, however, the delay to when the synchronization reproduction is performed is increased accordingly.

As still another method for recovering the transmission quality, there is a method in which the reception device 103 is provided with a buffer (network jitter handling buffer) for absorbing the fluctuation in the network transmission time (so-called network jitter). As a time for performing buffering using the network jitter handling buffer (so-called network jitter handling buffer time) is increased, it is possible to suppress the network jitter from having influence on various kinds of processes performed in the reception device 103. However, the delay to when the synchronization reproduction is performed is increased accordingly.

As described above, generally, a variety of delay elements exist in the data transmission, and it is necessary for the device in the reception side to secure a delay time for each of the delay elements.

In the related art, however, in order to deal with a request for image quality (image quality request) of decoded images, a request for the packet loss rate when data is transmitted (transmission quality), various kinds of delay times such as the variable compression encoding delay time, the redundant encoding block reception waiting time, the ARQ retransmitted packet waiting time, and the network jitter handling buffer time are set to be independent from each other.

The reception device 103 temporarily holds received data for a time equal to or more than the maximal value of the delay times such that the system does not fail due to the delays. In other words, it is necessary for the reception device 103 to secure a delay time for each of the delay elements. The time to hold the data is referred to as a reception buffer time.

In this case, for example, it is assumed that the variable compression encoding delay time is the maximal value of the above-described delay times, and this value is set as the reception buffer time. At this time, in the redundant encoding process, the burst loss resistance is improved by further increasing a redundant encoding block, and thereby an overall delay time is not increased even if the redundant encoding block reception waiting time is increased to a degree equal to the reception buffer time.

However, it is assumed that the redundant encoding block reception waiting time is set to be independent from other times in the same manner as the related art. In this case, the redundant encoding process is performed in a state where the redundant encoding block reception waiting time is small. In other words, in the redundant encoding process, there is a problem in that an unnecessary waiting time where no process is performed is generated, and thus a wasted delay time occurs.

Further, if the redundant encoding block reception waiting time is the maximum, it is possible to improve image quality without an increase in the overall delay time by setting the variable compression encoding delay time to be large. However, if the respective delay times are set to be independent from each other as in the above-described method in the related art, the encoding process is performed in a state where the variable compression encoding delay time is small. In other words, there is a problem in that a wasted delay time occurs.

The reception device 103 adjusts a length of each of delay times, which delay data transmission, for a plurality of different delay elements regarding the data transmission so as to match with the longest delay time of the plurality of delay times.

The transmission device 101 also sets parameters for each process based on information supplied from the reception device 103 such that a delay time is not increased more than the delay time secured by the reception device 103 (reception buffer time) and the delay time is lengthened more than the secured delay time, thereby improving image or transmission quality.

Therefore, the transmission system 100 (the transmission device 101 and the reception device 103) can improve image quality or transmission quality without increasing a delay time in the overall data transmission by suppressing such a wasted delay time.

Configuration of Transmission Device

As shown in FIG. 1, the transmission device 101 includes an encoding unit 111, an FEC unit 112, an RTP unit 113, a smoothing unit 114, a reference signal synchronization unit 115, a medium synchronization unit 116, an RTCP (RTP Control Protocol) unit 117, an ARQ unit 118, and a reception buffer time and processing parameter setting unit 119.

Video data (moving image data) input from the video input IF "VIDEO IN" via a video camera or the like is supplied to the encoding unit 111. The encoding unit 111 performs an encoding process for the moving image data by a predetermined encoding method. The encoding method is arbitrary but preferably achieves shorter delays. An example of the encoding method will be described later.

The encoding unit 111 has a rate control unit 121. The rate control unit 121 controls a bit rate of encoded data which is generated in the encoding unit 111. The encoding unit 111 RTP-packetizes the encoded data generated so as to be supplied to the FEC unit 112.

The FEC unit 112 generates redundant packets of the RTP packets supplied from the encoding unit 111.

The RTP unit 113 RTP-packetizes the redundant packets of the encoded data supplied from the FEC unit 112.

The smoothing unit 114 temporarily holds the RTP packets supplied from the RTP unit 113, and smoothes the RTP packets to a predetermined data rate for transmission.

The reference signal synchronization unit 115 communicates with a reference signal synchronization unit 139 of the reception device 103 which is a transmission destination via the network 102 and performs synchronization for a reference signal clock. The reference signal synchronization unit 115 supplies the reference signal synchronized with the reception device 103 to the medium synchronization unit 116.

The medium synchronization unit 116 supplies a time point synchronized with a sampling time point of the data input to the IF VIDEO IN by using the time point supplied from the reference signal synchronization unit 115 as a reference, to the encoding unit 111 (the RTP unit therein) and the RTP unit 113. This time point is added to the RTP packets as an RTP time stamp.

The RTCP unit 117 sends and receives an RTCP message to and from an RTCP unit 137 of the reception device 103 which is a transmission destination and thereby transmits and receives a control message (QoS control message) for a QoS (Quality of Service) control process. The RTCP unit 117 supplies the obtained control message to the ARQ unit 118 or the reception buffer time and processing parameter setting unit 119.

The ARQ unit 118 retransmits requested RTP packets according to a retransmission request message supplied from the RTCP unit 117.

The reception buffer time and processing parameter setting unit 119 sets parameters for the encoding unit 111 or the FEC unit 112 according to settings of various kinds of delay times supplied from the RTCP unit 117.

Configuration of Reception Device

As shown in FIG. 1, the reception device 103 includes a reception unit 131, a reception buffer 132, an RTP unit 133, an FEC unit 134, a decoding unit 135, an ARQ unit 136, an RTCP unit 137, a reception buffer time setting unit 138, a reference signal synchronization unit 139, a medium synchronization unit 140, an input unit 141, and an output unit 142.

The reception unit 131 receives the RTP packets transmitted from the transmission device 101 via the network 102, and supplies the received RTP packets to the reception buffer 132. In order to absorb fluctuations in delay times in the packet transmission on the network 102, the reception buffer 132 temporarily holds the RTP packets supplied from the reception unit 131 and then supplies the packets to the RTP unit 133 at a time point which is determined based on information from the reception buffer time setting unit 138 or the medium synchronization unit 140.

The RTP unit 133 reconfigures the RTP packets so as to generate FEC redundant encoded data which is encoded data including redundant packet, and supplies the generated FEC redundant encoded data to the FEC unit 134.

The FEC unit 134 detects loss of packets and recovers lost packet data through redundant encoding and decoding processes as necessary. The FEC unit 134 supplies the encoded data processed to the decoding unit 135.

The decoding unit 135 decodes the encoded data by a decoding method corresponding to the encoding method in the encoding unit 111. The decoded video data (moving image data) is output from the video output IF (VIDEO OUT) of the reception device 103 to, for example, a video display device (not shown) such as a display.

When the reception unit 131 detects lost packets through the detection of the lost packets (packets which may not be received), the ARQ unit 136 controls the RTCP unit 137 to transmit a retransmission request message to the ARQ unit 118 of the transmission device 101. The RTCP unit 137 supplies the retransmission request message requested by the ARQ unit 136 or various kinds of setting information supplied from the reception buffer time setting unit 138, to the RTCP unit 117 of the transmission device 101 as the RTCP message.

The reception buffer time setting unit 138 sets the reception buffer time and the like based on the image quality request, the transmission quality request, or the like which is input via, for example, the input unit 141. The image quality request is a request for image quality of decoded images (images of the video data output from the reception device 103). The transmission quality request is a request for a packet loss rate of the network 102 or the like. The reception buffer time is a delay time set in the reception device 103 such that the system does not fail and the data transmission is stably performed.

The reference signal synchronization unit 139 communicates with the reference signal synchronization unit 115 and synchronizes the reference signal with the transmission device 101. The medium synchronization unit 140 controls an RTP packet output timing from the reception buffer 132, a decoding process start timing in the decoding unit 135, or the like based on the reference signal synchronized by the reference signal synchronization unit 139.

The input unit 141 includes, for example, an arbitrary input device such as, for example, a keyboard, a mouse, a touch panel, or a switch, an external input terminal, or the like, receives the image quality request or the transmission quality request from outside of the reception device 103 such as, for example, a user, and supplies it to the reception buffer time setting unit 138.

The output unit 142 includes, for example, an arbitrary output device such as a monitor or a speaker, an external output terminal, or the like, displays a GUI image supplied from the reception buffer time setting unit 138, or outputs audio, thereby guiding input of the image quality request or the transmission quality request, or outputting the input result.

Configuration Example of Encoding Unit

Figure 2:
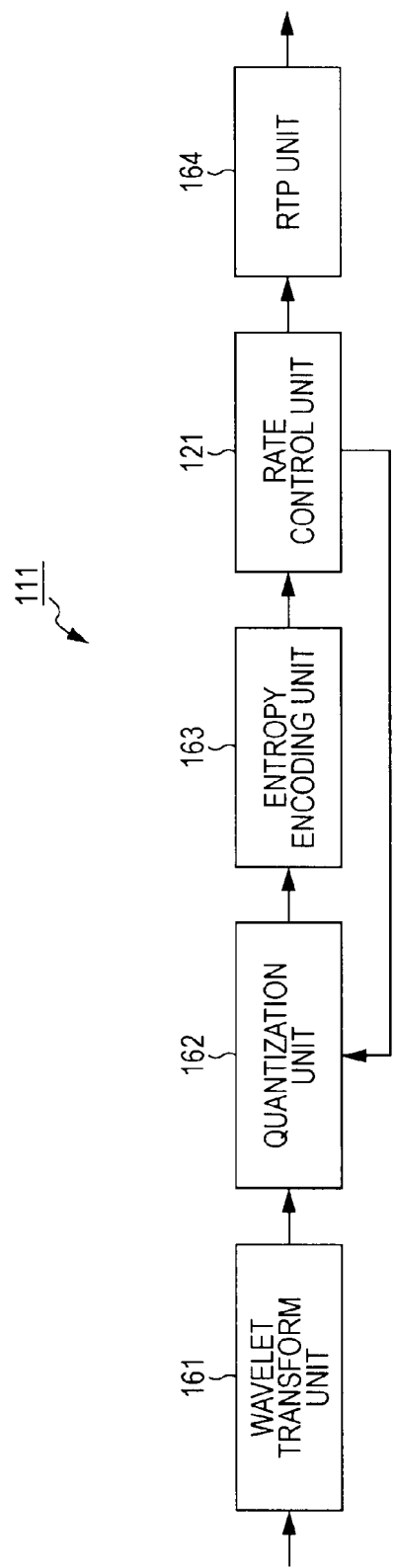
FIG. 2 is a block diagram illustrating a main configuration example of an encoding unit.

Next, an example of the encoding unit 111 of the transmission device 101 will be described. FIG. 2 is a block diagram illustrating a configuration example of the encoding unit 111 of the transmission device 101. The encoding unit 111 generates hierarchies of image data in a descending order regarding important degree of its resolution, and performs hierarchy encoding for each hierarchy so as to be encoded. For example, the encoding unit 111 generates hierarchical data in a descending order regarding important degree of spatial resolution. In addition, for example, the encoding unit 111 generates hierarchical data in a descending order regarding important degree of temporal resolution. Further, for example, the encoding unit 111 generates hierarchical data in a descending order regarding important degree of SNR (Signal to Noise Ratio). The encoding unit 111 encodes the hierarchical data generated in this way for each hierarchy.

As such a hierarchy encoding method, there is, for example, a JPEG (Joint Photographic Experts Group) 2000 scheme in which each picture of moving image data undergoes a wavelet transform and entropy encoding. The hierarchy encoding method is arbitrary, but, in the following, a case where the encoding unit 111 performs the wavelet transform and the entropy encoding for the moving image data every a plurality of lines will be described.

As shown in FIG. 2, the encoding unit 111 includes a wavelet transform unit 161, a quantization unit 162, an entropy encoding unit 163, the rate control unit 121, and an RTP unit 164. The wavelet transform unit 161 performs the wavelet transform for each picture of the moving image every a plurality of lines.

The wavelet transform is a process which performs analysis filtering for dividing input data into high frequency components and low frequency components in both of an image plane horizontal direction and an image plane vertical direction. In other words, the input data by the wavelet transform process is divided into four components (sub-bands) including a component (an LL component) which has low frequency in both of the horizontal direction and the vertical direction, a component (an HL component) which has high frequency in the horizontal direction and low frequency in the vertical direction, a component (an LH component) which has low frequency in the horizontal direction and high frequency in the vertical direction, and a component (an HH component) which has high frequency in both of the horizontal direction and the vertical direction.

The wavelet transform unit 161 recursively repeats the wavelet transform process for the component (the LL component) which has low frequency in both of the horizontal direction and the vertical direction and which is obtained by the analysis filtering, by a number of predetermined times. In other words, by the wavelet transform process, each picture of moving image data is divided into a plurality of hierarchical sub-bands (frequency components) (hierarchical data is generated). The entropy encoding unit 163 encodes each sub-band.

The image data for each picture of the moving image is input to the wavelet transform unit 161 for each line longitudinally from the upper side of the image. In addition, image data for each line is input for each sample (one column) transversely from the left side of the image.

Figure 3:
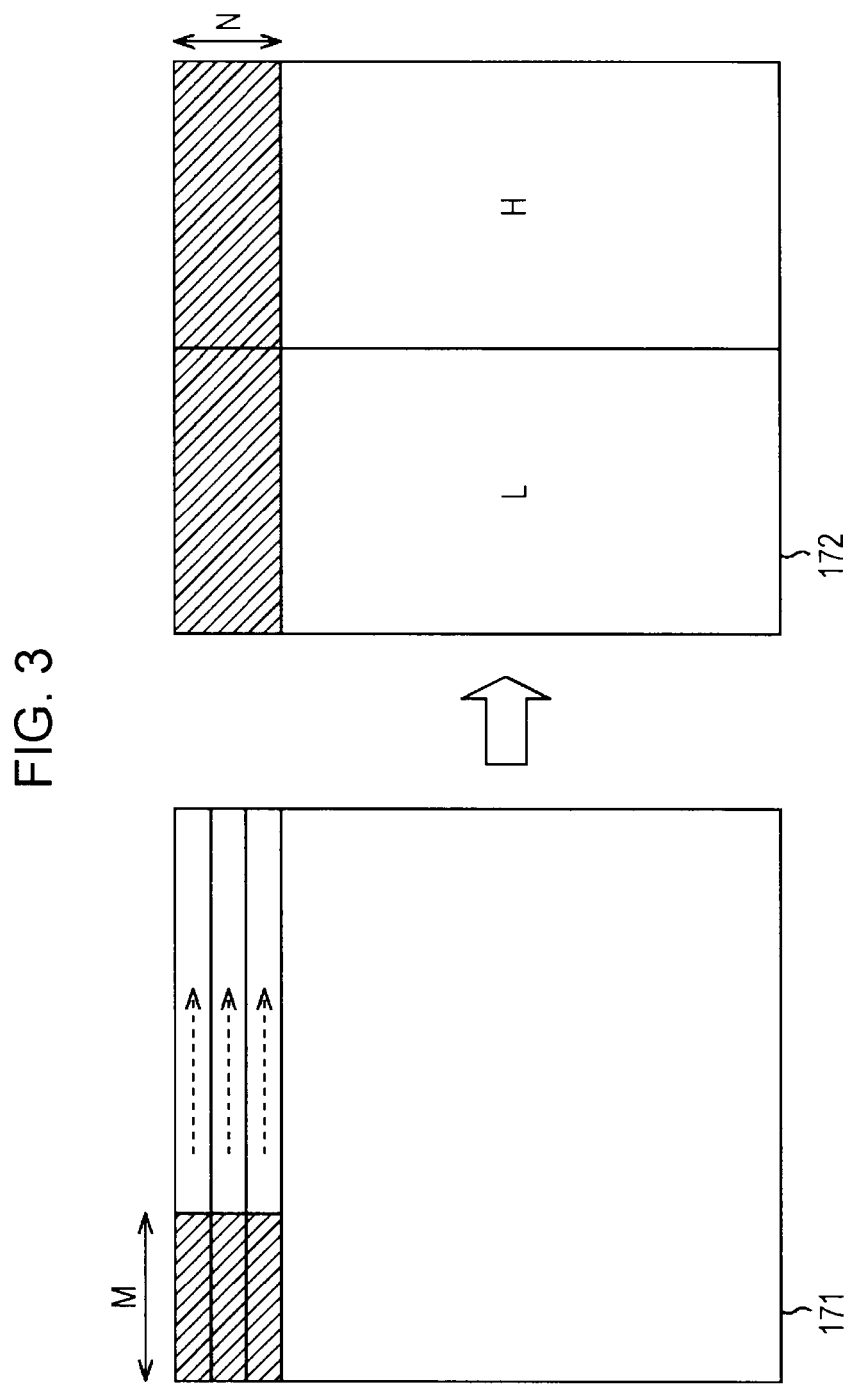
FIG. 3 is a diagram illustrating an outline of analysis filtering.

The wavelet transform unit 161 performs the analysis filtering in the image plane horizontal direction (horizontal analysis filtering) for the image data input in this way each time it is provided with data of the number of samples for which the analysis filtering can be performed (as soon as it is provided with the samples). For example, the wavelet transform unit 161 performs the horizontal analysis filtering for the image data 171 in the baseband shown in the left side of FIG. 3 each time M columns are input, and divides it into a component L having low frequency and a component H having high frequency in the horizontal direction for each line. The horizontal analysis filtering result 172 shown in the right side of FIG. 3 indicates components L having low frequency and components H having high frequency in the horizontal direction, corresponding to an amount of N lines which are divided by the wavelet transform unit 161.

Next, the wavelet transform unit 161 performs the analysis filtering in the vertical direction (vertical analysis filtering) for the respective components of the horizontal analysis filtering result 172. If coefficients of vertical lines necessary for the vertical analysis filtering are generated through the horizontal analysis filtering, the wavelet transform unit 161 performs the vertical analysis filtering for the coefficients of vertical lines necessary for the vertical analysis filtering for each column.

Figure 4:
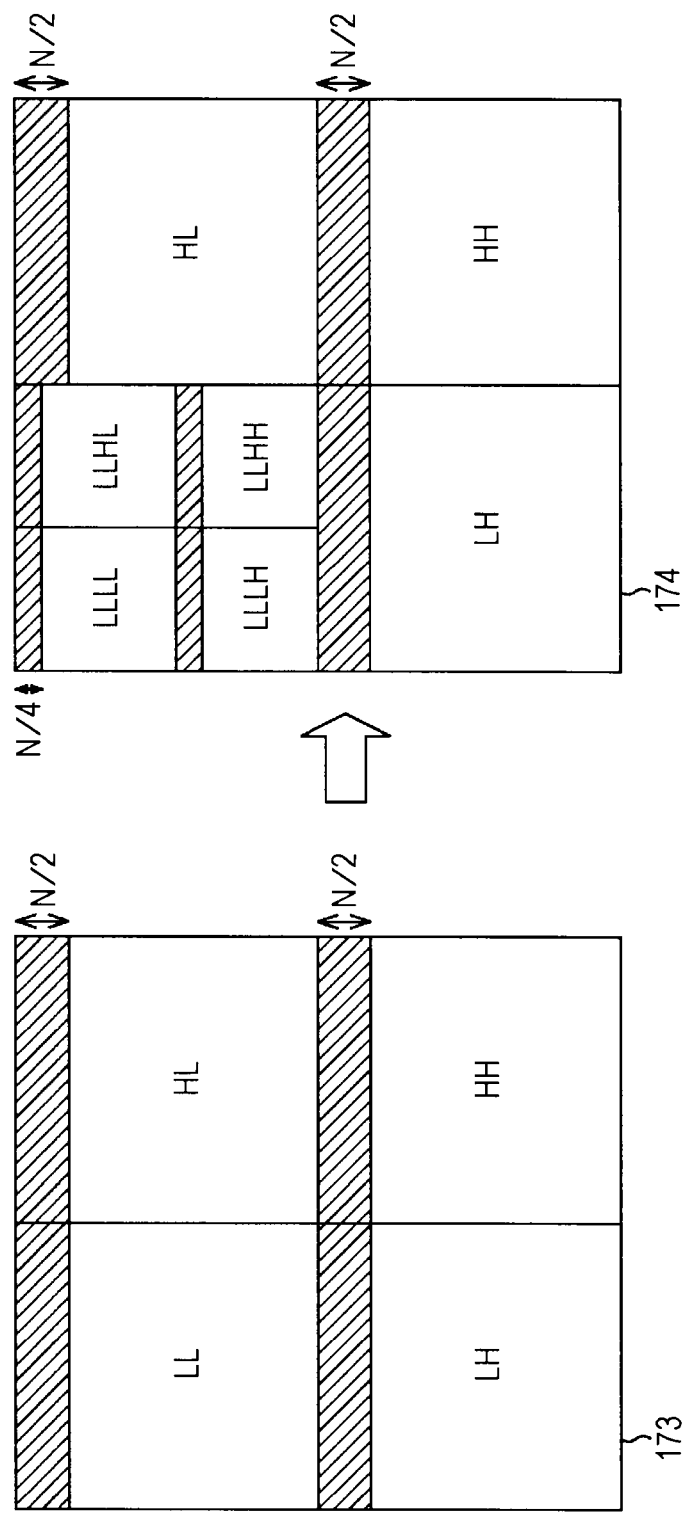
FIG. 4 is a diagram illustrating the outline of the analysis filtering and continues FIG. 3.

As a result, the horizontal analysis filtering result 172 is divided into wavelet transform coefficients (hereinafter, referred to as a coefficient) of four components including, as shown in the left side of FIG. 4, a component (an LL component) which has low frequency in both of the horizontal direction and the vertical direction, a component (an HL component) which has high frequency in the horizontal direction and low frequency in the vertical direction, a component (an LH component) which has low frequency in the horizontal direction and high frequency in the vertical direction, and a component (an HH component) which has high frequency in both of the horizontal direction and the vertical direction (hierarchical data 173).

Until coefficients of a predetermined hierarchy (division level) are obtained, the HL component, the LH component, and the HH component among the obtained analysis filtering results are output to an external device. The remaining LL component undergoes the second analysis filtering in the wavelet transform unit 161. In other words, for example, the hierarchical data 173 shown in the left side of FIG. 4 is transformed into the hierarchical data 174 shown in the right side of FIG. 4. In the hierarchical data 174, four components including an LLLL component, an LLHL component, an LLLH component, and an LLHH component are generated from the LL component.

Figure 5:
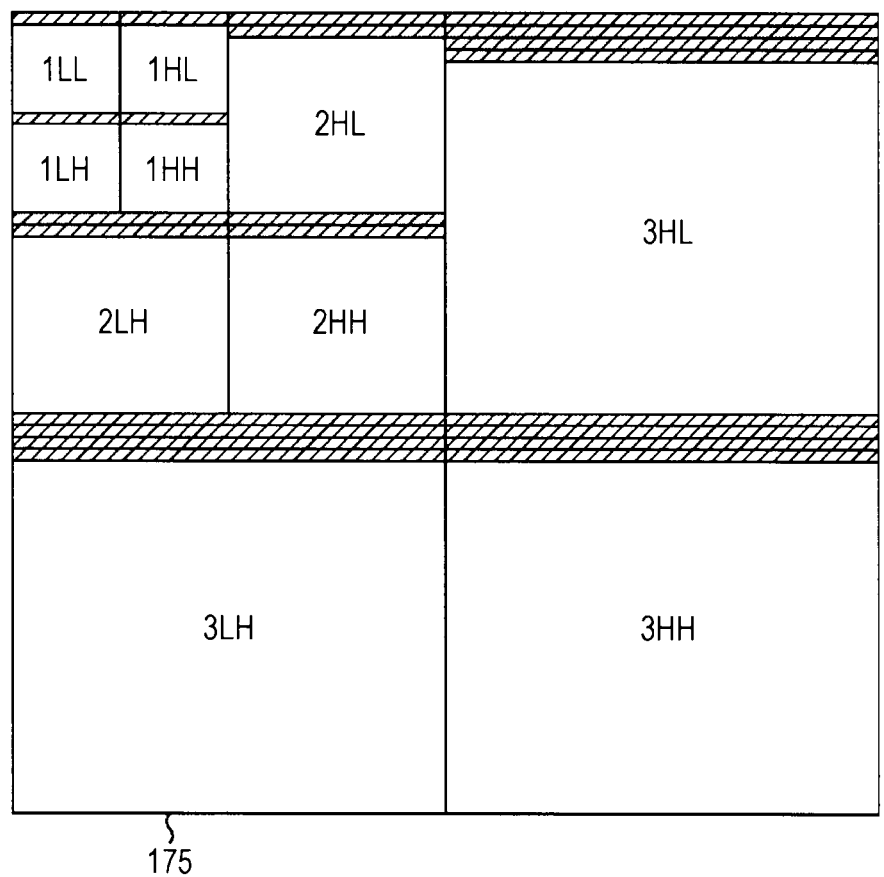
FIG. 5 is a diagram illustrating a line block.

The wavelet transform unit 161 recursively performs the analysis filtering for the moving image data by a number of predetermined times and generates hierarchical data which is hierarchized up to a desired division level. FIG. 5 is a diagram illustrating an example of hierarchical data which is hierarchized up to the division level 3 (three hierarchies). In FIG. 5, the hierarchical data 175 which is divided up to the division level 3 is constituted by the respective sub-bands including the 3HL component, the 3LH component, and the 3HH component for the division level 1 (hierarchy number 3), the 2HL component, the 2LH component, and the 2HH component for the division level 2 (hierarchy number 2), and the 1LL component, the 1HL component, the 1LH component, and the 1HH component for the division level 3 (hierarchy number 1).

In the wavelet transform process, the number of generated lines becomes smaller in inverse proportion to the square of 2 each time the filtering is repeated (each time the hierarchy decreases by one lower rank). The number of lines in the baseband necessary to generate one line of coefficients of a final division level (hierarchy number 1) can be determined by how many times the filtering is repeated (the number of hierarchies of the final division level). Typically, the number of hierarchies is set in advance.

Image data in the baseband (image data of a plurality of lines) necessary to generate one line of coefficients of the final division level or coefficients of each hierarchy are collectively referred to as a line block (or precinct).

In FIG. 5, parts marked with the diagonal lines are coefficients forming the one line block. As shown in FIG. 5, the line block includes the coefficients corresponding to one line of the respective components of the hierarchy number 1, the coefficients corresponding to two lines of the respective components of the hierarchy number 2, and the coefficients corresponding to four lines of the respective components of the hierarchy number 3. In addition, the image data corresponding to them before the analysis filtering is performed, that is, in this example, image data corresponding to an amount of eight lines is also referred to as a line block (or precinct).

Referring to FIG. 2 again, the quantization unit 162 quantizes the coefficients of the respective components generated by the wavelet transform unit 161 by dividing the coefficients by, for example, quantization step size, and generates quantization coefficients. At this time, the quantization unit 162 may set the quantization step size for each line block (precinct). The line block includes the coefficients of all the frequency components in a certain image region (in the case of FIG. 5, ten frequency components from 1LL to 3HH), and thus the quantization for each line block can achieve the advantage in the multiple resolution analysis which is a feature of the wavelet transform. In addition, only the number of the line blocks is set on the entire image plane, and thus a load of the quantization is reduced.

In addition, since energy of an image signal is generally concentrated on the low frequency components and further the human eye is sensitive to deterioration in low frequency components, it is preferable to perform weighting during the quantization such that the quantization step size in the sub-bands of the low frequency components resultantly has a small value. By this weighting, a relatively large amount of information is allocated to the low frequency components and thus subjective image quality is entirely improved.

The entropy encoding unit 163 performs source coding for the quantization coefficients generated by the quantization unit 162 so as to generate compressed encoded data, and supplies the generated compressed encoded data to the rate control unit 121. The source coding may use, for example, the Hoffman coding used in the JPEG scheme or the MPEG (Moving Picture Experts Group) scheme or a high density arithmetic coding used in the JPEG 2000 scheme.

Here, whether the entropy encoding is performed for coefficients in which range is a very important factor which is directly related to compression efficiency. For example, in the JPEG scheme or the MPEG scheme, DCT (Discrete Cosine Transform) is performed for a 8×8 block, and information is compressed by performing the Huffman coding for the generated 64 DCT coefficients. In other words, the 64 DCT coefficients belong to a range of the entropy encoding.

The wavelet transform unit 161 performs the wavelet transform for the 8×8 block with line units unlike the DCT, and thus the entropy encoding unit 163 performs the source coding for the block independently for each frequency band (sub-band) and further every P line(s) in each frequency band.

P is one line as the minimum, however, since reference information is little in a case where the number of lines is small, a memory capacity can be reduced. In contrast, in a case where the number of lines is large, since an amount of information is increased accordingly, encoding efficiency can be improved. However, if P becomes a value exceeding the number of lines in a line block in each frequency band, even lines in a next line block are necessary. For this reason, the entropy encoding unit 163 waits for quantization coefficient data for the line block to be generated by the wavelet transform and the quantization, and this waiting time becomes a delay time.

Therefore, for the short delay, P is preferably equal to or less than the number of lines of a line block. For example, in the example shown in FIG. 5, since the number of lines of the line block is one in the frequency bands of 1LL, 1HL, 1LH, and 1HH, P is 1. In addition, since the number of lines of the line block is two in the sub-bands of 2HL, 2LH, and 2HH, P is 1 or 2.

The rate control unit 121 finally performs a control according to a target bit rate or a compression ratio, and outputs the encoded data after the rate control to the RTP unit 164. For example, the rate control unit 121 transmits a control signal to the quantization unit 162 so as to decrease the quantization step size in a case of increasing the bit rate, and to increase the quantization step size in a case of decreasing the bit rate.

The RTP unit 164 RTP-packetizes the encoded data supplied from the rate control unit 121 so as to be supplied to the FEC unit 112.

Configuration Example of Decoding Unit

Figure 6:
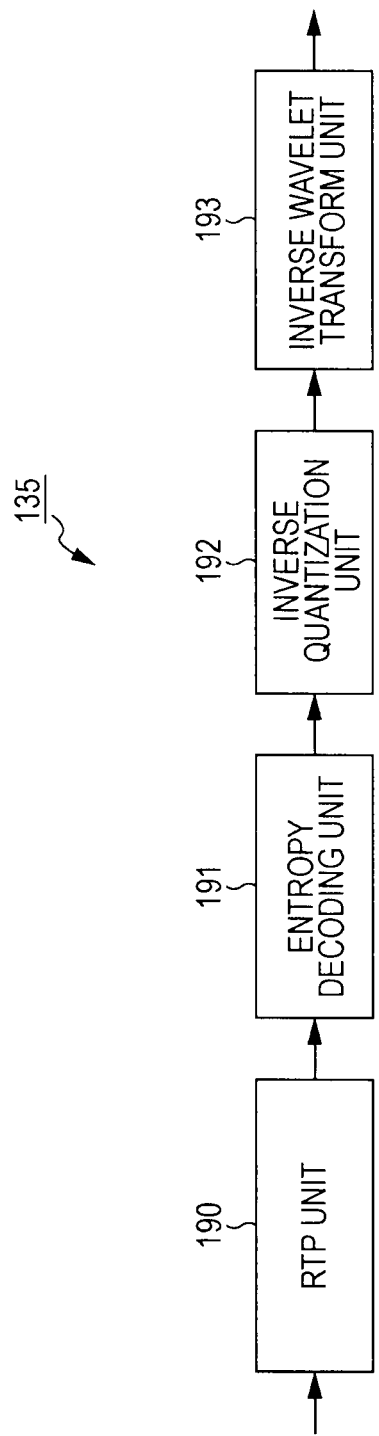
FIG. 6 is a block diagram illustrating a main configuration example of a decoding unit.

Next, an example of the decoding unit 135 corresponding to the example of the above-described encoding unit 111 will be described. FIG. 6 is a block diagram illustrating a configuration example of the decoding unit 135 of the reception device 103. In FIG. 6, the decoding unit 135 includes an RTP unit 190, an entropy decoding unit 191, an inverse quantization unit 192, and an inverse wavelet transform unit 193.

The RTP unit 190 converts the RTP packets supplied from the FEC unit 134 into encoded data and supplies the encoded data to the entropy decoding unit 191. The entropy decoding unit 191 decodes the encoded data by a method corresponding to the encoding method in the entropy encoding unit 163 and generates quantization coefficient data. For example, Huffman decoding or high efficiency arithmetic decoding may be used. In addition, when the encoding has been performed every P line(s) in the entropy encoding unit 163, the entropy decoding unit 191 independently performs the decoding for each sub-band and every P line(s) in each sub-band.

The inverse quantization unit 192 performs the inverse quantization by multiplying the quantization coefficient data by the quantization step size and generates coefficient data. The quantization step size is typically described in headers of the encoded data supplied from the transmission device 101. In addition, when the quantization step size has been set for each line block in the quantization unit 162, the inverse quantization unit 192, in the same manner, performs the inverse quantization by setting an inverse quantization step size for each line block.

The inverse wavelet transform unit 193 performs a process reverse to the process in the wavelet transform unit 161. In other words, the inverse wavelet transform unit 193 performs filtering (synthesis filtering) which synthesizes low frequency components and high frequency components for the coefficient data which is divided into a plurality of frequency bands by the wavelet transform unit 161, in both of the horizontal direction and the vertical direction. The inverse wavelet transform unit 193 recovers the video data in the baseband through the inverse wavelet transform, and outputs the recovered video data to outside of the reception device 103 from the IF VIDEO OUT.

Of course, the above-described encoding unit 111 and decoding unit 135 are only an example, and other encoding and decoding methods may be used.

Transmission Process

Next, each process performed in the transmission system 100 will be described. First, a transmission process will be described in which video data is transmitted from the transmission device 101 to the reception device 103 via the network 102.

In the transmission device 101, the video data input from the video input IF "VIDEO IN" via a video camera is input to the encoding unit 111 which performs the encoding process for moving image data and is encoded. The encoded data is RTP-packetized by the RTP unit 164 of the encoding unit 111 and is output. The output RTP packets undergoes the FEC redundant encoding process in the FEC unit 112, RTP-packetized for use in FEC redundant encoded data by the RTP unit 113, and transmitted to the network 102 from the smoothing unit 114 as the RTP packets.

An RTP time stamp for synchronization which is designated by the medium synchronization unit 116 is set in each RTP packet.

The reception device 103 receives the RTP packets transmitted from the transmission device 101 using the reception unit 131 and stores the packets in the reception buffer 132. At this time, if lost packets are detected, the reception device 103 notifies the ARQ unit 136 of the detection such that the ARQ unit 136 performs a retransmission request process.

The reception buffer 132 determines a reception buffer output time point based on the reception buffer time determined by the reception buffer time setting unit 138, the time point information sent from the medium synchronization unit 140, and the RTP time stamp set in each RTP packet, and outputs each RTP packet to the RTP unit 133 at a predetermined time point.

The RTP unit 133 performs a reconfiguration process in which the RTP packets are converted into FEC redundant encoded data and outputs the converted FEC redundant encoded data to the FEC unit 134. The FEC unit 134 detects lost packets. When the lost packets are detected, the FEC unit 134 recovers the lost packet data through the redundant encoding and decoding processes.

The encoded data (RTP packets) processed in this way is supplied to the decoding unit 135. The decoding unit 135 generates encoded data by converting the supplied RTP packets of the encoded data, and decodes the encoded data. The decoded video data is supplied and output from the video output IF "VIDEO OUT" to a video display device such as, for example, a display.

Reference Signal Synchronization Process

Next, a reference signal synchronization process will be described in which a reference signal is synchronized between the transmission device 101 and the reception device 103. The reference signal synchronization unit 115 and the reference signal synchronization unit 139 communicate with each other, and synchronize the reference signal clock between the transmission device 101 and the reception device 103 using IEEE 1588 PTP (Precision Time Protocol).

As a frequency of the reference signal clock, for example, a pixel sampling frequency of the input video image is used. In addition, when video data output from a video output device is input from the IF "VIDEO IN", the reference signal may be synchronized between the transmission device 101 and the video output device.

Further, the synchronization of the reference signal between the transmission device 101 and the reception device 103 by the reference signal synchronization unit 115 and the reference signal synchronization unit 139 is arbitrary, and the reference signal may not be synchronized between the devices.

Medium Synchronization Process

Next, a medium synchronization process will be described in which the video data is synchronized based on the reference signal. The medium synchronization unit 116 of the transmission device 101 converts a time point synchronized with a sampling time point of the data input from the IF "VIDEO IN" into a frequency of the RTP time stamp based on the time point sent from the reference signal synchronization unit 115, and the converted frequency is added to each of the RTP packets as an RTP time stamp in the RTP unit 164 of the encoding unit 111 and the RTP unit 113.

The medium synchronization unit 140 of the reception device 103 holds the reference clock time point information sent from the reference signal synchronization unit 139 as a system time point which is converted into the RTP time stamp frequency.

When the RTP packets are stored in the reception buffer 132 of the reception device 103, the reception buffer 132 determines a reception buffer output time point of each RTP packet based on the RTP time stamp value of the RTP packet, the reception buffer time sent from the reception buffer time setting unit 138, and the RTP time stamp frequency time point supplied from the medium synchronization unit 140.

The reception buffer output time points of the RTP packets are determined, for example, as follows. A leading packet of the stream data is output from the reception buffer after a time point when the reception buffer time TSTIME_BUF has elapsed from a reception time point. In contrast, a subsequent packet is output in synchronization with a time point which is calculated based on a difference value between an RTP time stamp value of the leading packet and an RTP time stamp value of a corresponding packet.

The reception buffer output time point $TSSYS\_BO\_n$ of an RTP packet n is calculated using, for example, the following Equation (1). An RTP time stamp value of the stream leading packet is denoted by $TSPKT\_init$, a reception time point (system time point conversion: a frequency is an RTP time stamp frequency) is denoted by $TSSYS\_init$, and an RTP time stamp value of the RTP packet n is denoted by $TSPKT\_n$.

$$TSSYS\_BO\_n = (TSPKT\_n - TSPKT\_init) + TSSYS\_init + TSTIME\_BUF \quad (1)$$

Encoding Process and Decoding Process

Next, a codec process (encoding process and decoding process) for video data performed by the transmission device 101 and the reception device 103 will be described. The encoding unit 111 uses a hierarchy encoding method of performing the wavelet transform for several lines of each picture of a moving image as one encoding block, which is proposed by Japanese Patent No. 4371120, and an encoding method in which an associated input data range is different for each hierarchy.

The encoding unit 111 generates encoded data through the encoding process, and the decoding unit 135 performs the decoding process for decoding the encoded data.

The encoding unit 111 includes the rate control unit 121 as described above. For example, in a token bucket behavior described in ITU-T Y.1221, the rate control unit 121 performs a rate control for controlling an encoding rate so as not to exceed a bucket by using a bucket size as an encoder expected buffer size B (byte) and a bucket rate R (bps) as the encoding rate. A necessary buffer time in the reception device 103 of when this is transmitted through the smoothing is referred to as a "variable compression encoding delay request time".

The variable compression encoding delay request time $Bt\_codec\_req$ (sec) is calculated, for example, as in the following Equation (2).

$$Bt\_codec\_req = B \times 8 / R \quad (2)$$

The encoder expected buffer size B is determined according to the image quality request designated by a user or the like. In the case of compression encoding using the VBR method, a large amount of data can be used in image parts having high complexity by increasing the encoder expected buffer size B, thereby improving image quality. In other words, if the image quality request is high, it is possible to deal with the high request by increasing the encoder expected buffer size B.

However, if the encoder expected buffer size B is increased, the variable compression encoding delay request time $Bt\_codec\_req$ (sec) becomes large, and thus there is a concern that delays are increased.

RTCP Process

Next, an RTCP process of a QoS control process which is performed between the transmission device 101 and the reception device 103 will be described. The RTCP unit 117 and the RTCP unit 137 perform transmission and reception of an RTCP message between the transmission device 101 and the reception device 103 using the RTCP described in IETF RFC 3550, and thereby collect information such as packet loss rate information, a round trip time (RTT) information, and network jitter information, or perform transmission and reception of a control message for the QoS control process. The QoS control message includes, for example, the retransmission request message in the ARQ process, and the like.

FEC Process

Next, an FEC process of the QoS control process will be described. The FEC unit 112 performs FEC redundant encoding for units of the RTP packets of encoded data supplied from the encoding unit 111. For example, the FEC unit 112 performs the redundant encoding using an erasure error correction code (ECC) such as the Reed-Solomon code or the like.

The redundancy in the FEC redundant encoding is determined by the transmission quality request designated by, for example, a user or the like. The redundancy is designated in a form of (the number of original data packets, the number of redundant packets). The user also designates an expected packet loss rate p on a network.

Hereinafter, a set of (the number of original data packets, the number of redundant packets) is designated as one redundant encoding unit (so-called FEC block). For example, if (the number of original data packets, the number of redundant packets) is designated as (10, 5), the FEC unit 112 of the transmission device 101 generates five redundant packets for ten original data packets. In other words, a total of fifteen packets are transmitted in this FEC block.

In this case, when arbitrary ten packets of the FEC block packets are received, the FEC unit 134 of the reception device 103 can decode the original data through the FEC decoding process. For example, if it is assumed that a packet loss rate designated by a user is p, the number of packets in the FEC block is n, the number of original data packets is k, the number of redundant packets is n-k, and a target FEC block loss rate designated by the user as the transmission quality request is Pt, the target FEC block loss rate Pt is expressed as in the following Equation (3).

$$P_t \geq 1 - \sum_{j=0}^{n-k} {}_nC_j p^j (1-p)^{n-j} \quad (n > k) \quad \text{Equation (3)}$$

The number of original data packets k and the number of redundant packets n-k are determined so as to satisfy Equation (3).

It is necessary for the reception device 103 (the FEC unit 134) to set the reception buffer time to be equal to or more than a time (so-called redundant encoding block reception waiting time) until an end packet arrives after a leading packet of the FEC block arrives at the reception device 103 in order to recover lost packets through the FEC redundant encoding process.

The redundant encoding block reception waiting time corresponding to the FEC block which is set according to the transmission quality request designated by a user or the like is referred to as a "redundant encoding block reception waiting request time".

ARQ Process

In the ARQ process in the reception device 103, the reception unit 131 detects lost packets using sequence numbers of the RTP packets, the ARQ unit 136 generates a retransmission request message for the lost packets, and the RTCP unit 137 transmits the retransmission request message to the transmission device 101, thereby making a request for the retransmission.

In addition, in the case where the ARQ unit 136 of the reception device 103 performs the retransmission request with regard to the packet loss, and the reception unit 131 does not receive retransmitted packets even after the round trip time (ARQ retransmission packet waiting time) has elapsed, the request for retransmission may be made again. Further, the request for retransmission may be repeatedly made until the ARQ unit 136 determines that the retransmitted packets arrive out of line with a reception buffer output time point of a corresponding packet.

In the ARQ process in the transmission device 101, when the RTCP unit 117 receives the retransmission request message, the ARQ unit 118 generates RTP packets to be retransmitted (retransmitted packets), and supplies the retransmitted packets to the smoothing unit 114 for retransmission.

A recovery performance in the ARQ process depends on the ARQ retransmitted packet waiting time which is a time when the reception device 103 waits for the retransmitted packets retransmitted by the request from the ARQ unit 136. Although the recovery performance is improved according to a large ARQ retransmitted packet waiting time, the reception buffer time equal to or more than the ARQ retransmitted packet waiting time is necessary, and thus there is a concern that delays are increased.

The "ARQ retransmitted packet waiting time" is determined by the transmission quality request designated by a user or the like.

Network Jetter Handling Process

The reception buffer 132 of the reception device 103 is commonly used as a network jitter handling process mechanism. The reception buffer 132 sets a time equal to or more than a "network jitter handling buffer request time" determined by the transmission quality request designated by a user or the like as the reception buffer time. Thereby, a synchronization process for a packet which has jitter equal to or less than the "network jitter handling buffer request time" is possible.

Overall Data Transmission Processes

Next, an example of the flow of the overall data transmission processes performed in the transmission system 100 will be described with reference to the flowchart of FIG. 7.

The reception buffer time setting unit 138 of the reception device 103 controls the input unit 141 and the output unit 142 to receive the image quality request and the transmission quality request in step S121.

Figure 8:
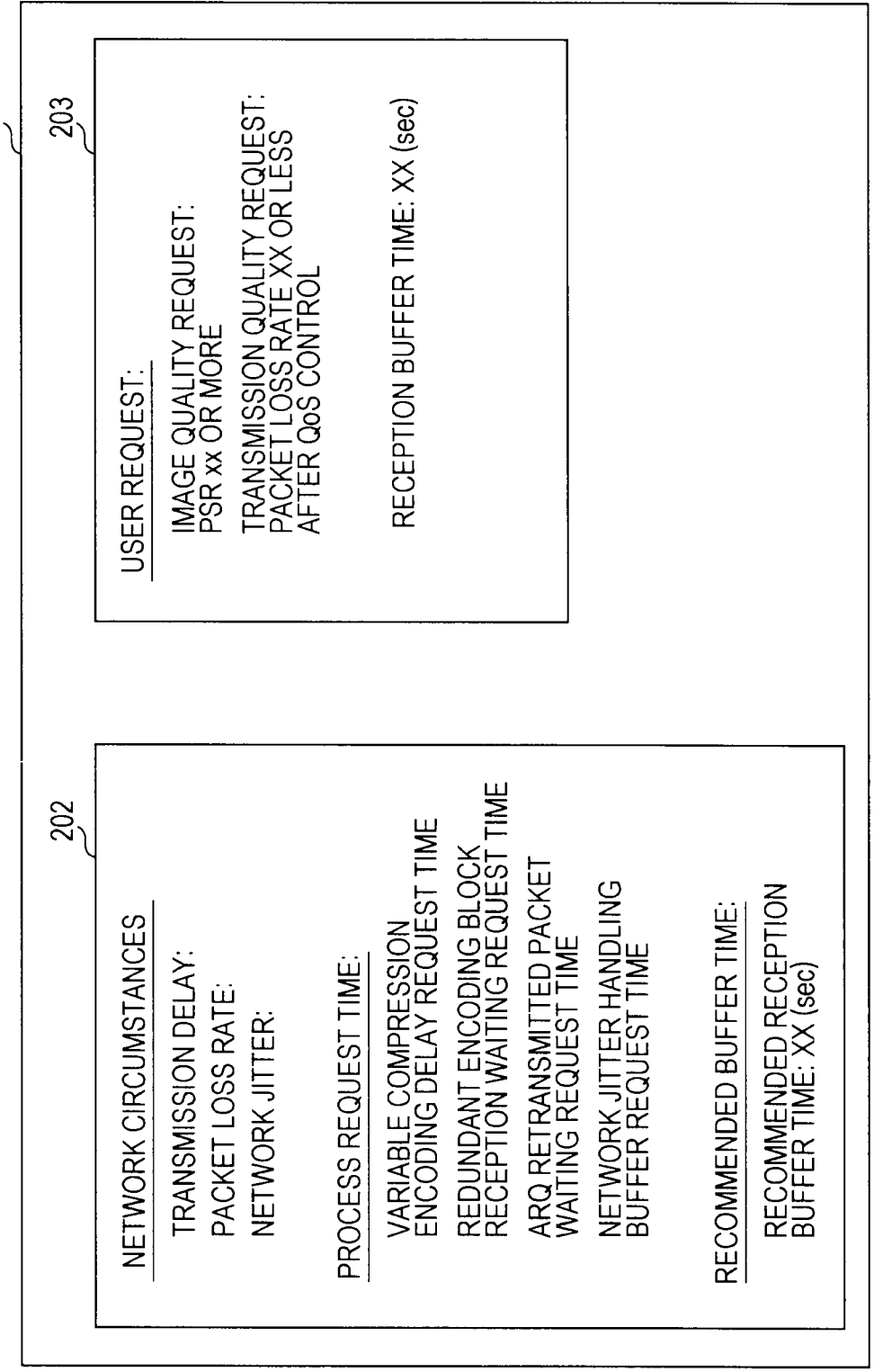
FIG. 8 is a diagram illustrating a display example of a request reception screen.

The reception buffer time setting unit 138 displays a GUI as shown in FIG. 8 on, for example, a monitor of the output unit 142, and controls the input unit 141 to receive a user's operation performed based on the GUI.

FIG. 8 is a diagram illustrating a display example of a request reception screen which is a GUI receiving the image quality request, the transmission quality request, and the like. As shown in FIG. 8, the request reception screen 201 is provided with a display portion 202 and a request portion 203. The request portion 203 represents items which can be input by a user. The display portion 202 displays a result of information input by the user.

The request portion 203 represents that, for example, the "image quality request" or the "transmission quality request" can be input as a "user request". For example, in a case of designating image quality, the user selects the "image quality request" and inputs a requested quality (for example, a PSR value or the like). Further, for example, in a case of designating transmission quality, the user selects the "transmission quality request" and inputs requested quality (for example, a packet loss rate after the QoS control, or the like).

The user may designate the reception buffer time from the request portion 203. For example, the user selects the "reception buffer time" and inputs a requested time, thereby setting the longest time which is allowable as the "reception buffer time".

The display portion 202 displays various kinds of information which reflects information input to the request portion 203.

For example, the display portion 202 displays "transmission delay", "packet loss rate", and "network jitter" as "network circumstances".

In addition, for example, the display portion 202 displays "variable compression encoding delay request time", "redundant encoding block reception waiting time", "ARQ retransmitted packet waiting request time" and "network jitter handling buffer request time" as a "process request time".

Further, for example, the display portion 202 displays "recommended reception buffer time" which is recommended as the reception buffer time.

The requests are input based on the GUI, and thereby the user can more easily set the image quality request, the transmission quality request, the reception buffer time, and the like.

Referring to FIG. 7 again, when the image quality request or the transmission quality request is received, the reception buffer time setting unit 138 performs a reception buffer time determining process in step S122, and performs setting for the ARQ unit 136 or the reception buffer 132, or notifies the transmission device 101 of determined information and the like via the RTCP unit 137.

When the notification is received via the RTCP unit 117, the reception buffer time and processing parameter setting unit 119 of the transmission device 101 performs a reception buffer time and processing parameter setting process based on the notification in step S101, and performs setting for the encoding unit 111 or the FEC unit 112.

When the setting is completed, the respective units of the transmission device 101 perform data transmission (data sending) in cooperation with the reception device 103 in step S102. In order to correspond to this process, the respective units of the reception device 103 perform data transmission (data receiving) in cooperation with the transmission device 101 in step S123.

In such a data transmission, the above-described various kinds of processes are appropriately performed.

As described above, the transmission device 101 and the reception device 103 perform setting for the respective units according to the image quality request or the transmission quality request designated by a user or the like in cooperation with each other. Thereby, the transmission device 101 and the reception device 103 optimize a delay time in each process and can reduce wasted delay times by using extra time in each process to improve image quality or transmission quality. In other words, it is possible to suppress deterioration in the quality of content.

Reception Buffer Timer Determining Process

Figure 9:
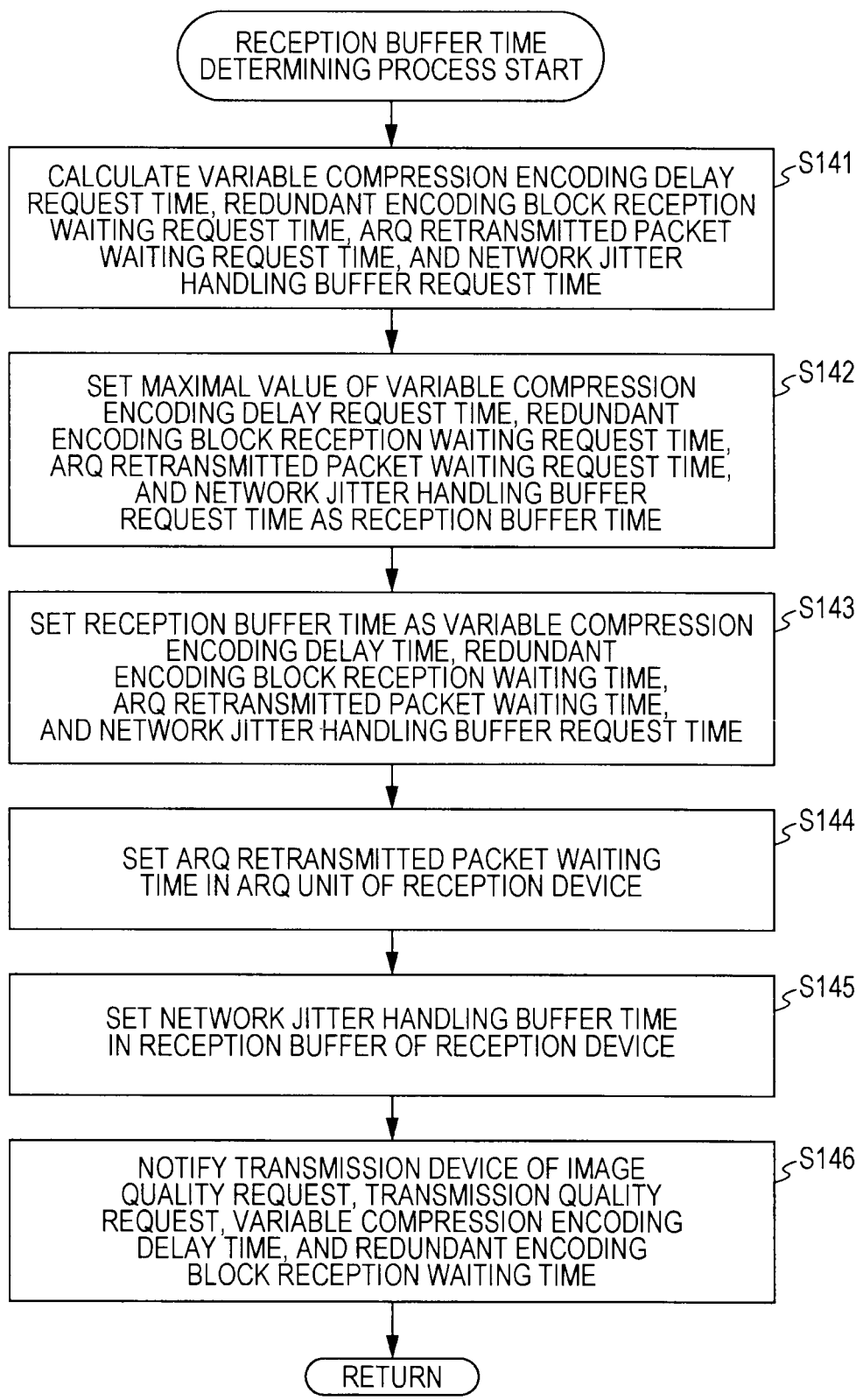
FIG. 9 is a flowchart illustrating an example of a flow of a reception buffer time determining process.

Next, an example of the flow of the reception buffer time determining process performed in step S122 in FIG. 7 will be described with reference to the flowchart of FIG. 9.

When the reception buffer time determining process starts, the reception buffer time setting unit 138 sets various kinds of delay times or waiting times based on the image quality request or the transmission quality request from a user or the like in step S141.

For example, the reception buffer time setting unit 138 calculates a "variable compression encoding delay request time" which is a time requested as the "variable compression encoding delay time", a "redundant encoding block reception waiting request time" which is a time requested as the "redundant encoding block reception waiting time", an "ARQ retransmitted packet waiting request time" which is a time requested as the "ARQ retransmitted packet waiting time", and a "network jitter handling buffer request time" which is a time requested as the "network jitter handling buffer time", based on a setting value of the image quality request or the transmission quality request.

Although the values are used as setting values as they are in the case of the method in the related art, the reception buffer time setting unit 138 resets the values so as to be aligned with the maximal value thereof. In step S142, the reception buffer time setting unit 138 sets the maximal value of the "variable compression encoding delay request time", the "redundant encoding block reception waiting request time", the "ARQ retransmitted packet waiting request time", and the "network jitter handling buffer request time" as the "reception buffer time", as shown in the following Equation (4).

$$\text{"Reception buffer time"}=\text{MAX}(\text{"variable compression encoding delay request time"},\text{"redundant encoding block reception waiting request time"},\text{"ARQ retransmitted packet waiting request time"},\text{"network jitter handling buffer request time"}) \quad (4)$$

In Equation (4), MAX( ) is a function for calculating the maximal value.

When the "reception buffer time" is calculated, the reception buffer time setting unit 138, as shown in the following Equation (5), sets the "reception buffer time" as the "variable compression encoding delay request time", the "redundant encoding block reception waiting request time", the "ARQ retransmitted packet waiting request time", and the "network jitter handling buffer request time" in step S143.

$$\text{"Variable compression encoding delay request time"}=\text{"redundant encoding block reception waiting request time"}=\text{"ARQ retransmitted packet waiting request time"}=\text{"network jitter handling buffer request time"}=\text{"reception buffer time"} \quad (5)$$

Figure 10:
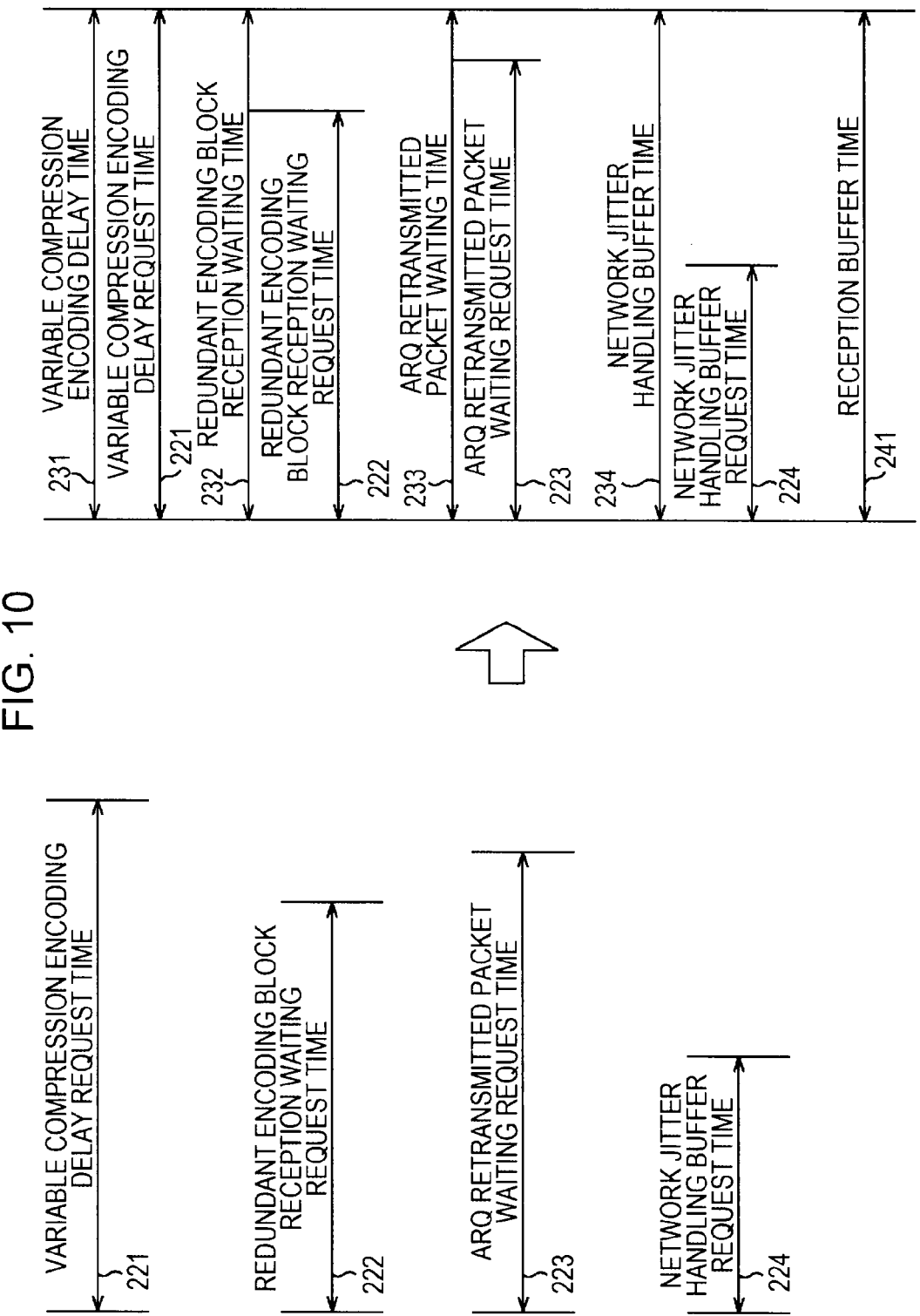
FIG. 10 is a diagram illustrating an example of a case of setting a delay time.

For example, it is assumed that the variable compression encoding delay request time 221, the redundant encoding block reception waiting request time 222, the ARQ retransmitted packet waiting request time 223, and the network jitter handling buffer request time 224 have the lengths as shown in the left side of FIG. 10.

In this case, the variable compression encoding delay request time 221 is the longest, and thus, as shown in the right side of FIG. 10, the reception buffer time 241 is set to the same length as the variable compression encoding delay request time 221. The variable compression encoding delay time 231, the redundant encoding block reception waiting time 232, the ARQ retransmitted packet waiting time 233, and the network jitter handling buffer time 234 can be aligned with the reception buffer time 241.

In other words, in this case, the redundant encoding block reception waiting time 232, the ARQ retransmitted packet waiting time 233, and the network jitter handling buffer time 234 are respectively set to be longer than the requested times.

Referring to FIG. 9 again, when the respective times are set, the reception buffer time setting unit 138 sets the "ARQ retransmitted packet waiting time" in the ARQ unit 136 in step S144 and uses it to determine whether or not to make a request for retransmission.

In addition, in step S145, the reception buffer time setting unit 138 sets the "network jitter handling buffer time" in the reception buffer 132.

In step S146, the reception buffer time setting unit 138 notifies the transmission device 101 of the "image quality request", the "transmission quality request", the "variable compression encoding delay time", and the "redundant encoding block reception waiting time" as an RTCP message via, for example, the RTCP unit 137.

Figure 7:
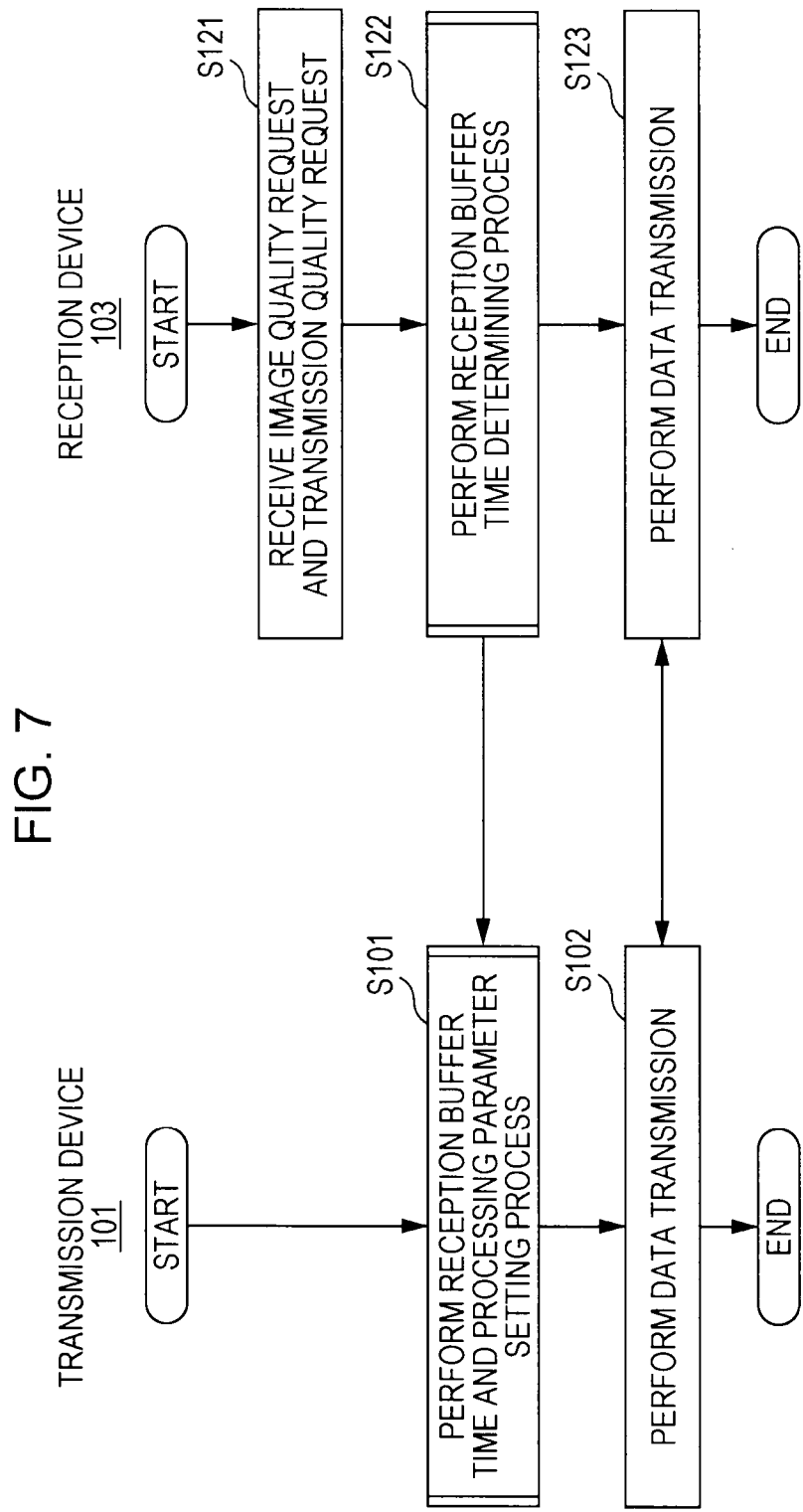
FIG. 7 is a flowchart illustrating an example of a flow of a data transmission process.

When the notification is completed, the reception buffer time setting unit 138 finishes the reception buffer time determining process, and the flow returns to step S102 in FIG. 7 so as to perform the process in step S103.

Reception Buffer Time and Processing Parameter Setting Process

Figure 11:
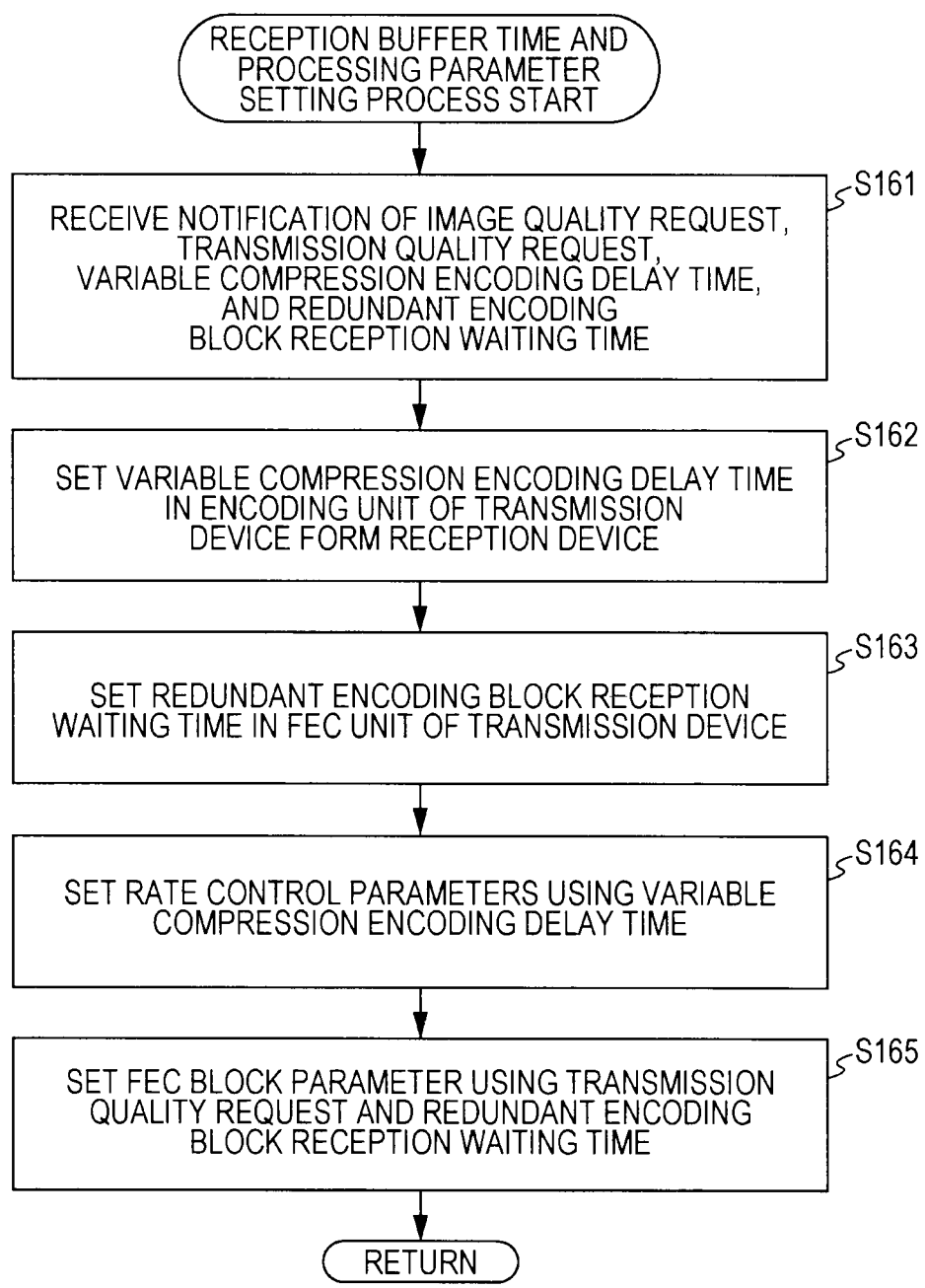
FIG. 11 is a flowchart illustrating an example of a flow of a reception buffer time and processing parameter setting process.

Next, with reference to the flowchart of FIG. 11, the reception buffer time and processing parameter setting process performed in step S101 in FIG. 7 will be described.

When the reception buffer time and processing parameter setting process starts, the reception buffer time and processing parameter setting unit 119 obtains the "image quality request", the "transmission quality request", the "variable compression encoding delay time", and the "redundant encoding block reception waiting time" included in the RTCP message supplied from the reception device 103 via the RTCP unit 117 in step S161.

In step S162, the reception buffer time and processing parameter setting unit 119 sets the "variable compression encoding delay time" in the encoding unit 111. In step S163, the reception buffer time and processing parameter setting unit 119 sets the "redundant encoding block reception waiting time" in the FEC unit 112.

In step S164, the rate control unit 121 sets a rate control parameter using the "image quality request" or the "variable compression encoding delay time" which has been supplied. For example, the rate control unit 121 sets the encoder expected buffer size B (byte) so as to satisfy the following Equation (6). In addition, in Equation (6), Bt_codec (sec) denotes the variable compression encoding delay time. In addition, R(bps) denotes the packet rate.

$$Bt\_codec = B \times 8 / R \quad (6)$$

In step S165, the FEC unit 112 sets an FEC block parameter using the "transmission quality request" and the "redundant encoding block reception waiting time". The "redundant encoding block reception waiting time" is the maximal value of a time taken to transmit all of packets included in the FEC block through the smoothing. The FEC unit 112 adjusts the number of original data packets for each FEC block such that the time is equal to or less than the "redundant encoding block reception waiting time". In addition, the FEC unit 112 sets the number of redundant packets n-k, for example, so as to satisfy the above-described Equation (3).

When the process in step S165 is completed, the reception buffer time and processing parameter setting unit 119 finishes the reception buffer time and processing parameter setting process, and the flow returns to step S101 in FIG. 7 so as to perform the process in step S102.

As described above, through the various kinds of processes, the transmission device 101 and the reception device 103 can secure each delay time or waiting time so as to be as long as possible to an extent that delays are not increased, thereby using the extra time to improve image quality or transmission quality.

More specifically, the transmission device 101 sets the "variable compression encoding delay time" of the encoding unit 111 to be longer to an extent that delays are not increased, and can thereby set the encoder expected buffer size B (byte) to be larger. In addition, the transmission device 101 sets the "redundant encoding block reception waiting time" of the FEC unit 112 to be longer to an extent that delays are not increased, and can thereby set the FEC block or the redundancy to be larger.

The reception device 103 can set the "ARQ retransmitted packet waiting time" of the ARQ unit 136 to be longer to an extent that delays are not increased. In addition, the reception device 103 can set the "network jitter handling buffer time" of the reception buffer 132 to be longer to an extent that delays are not increased.

As described above, the transmission device 101 and the reception device 103 can reduce wasted delay times by using extra time in each process to improve image quality or transmission quality. In other words, the transmission device 101 and the reception device 103 can suppress deterioration in the quality of content due to the above-described various kinds of processes regarding the data transmission.

2. Second Embodiment

Another Example of Overall Data Transmission Processes

In the above description, although the case where the reception buffer time or the processing parameters are determined only by the request from a user or the like has been described, the present disclosure is not limited thereto, but the reception buffer time or the processing parameters may be set according to circumstances regarding communication of the network 102.

In this case, circumstances regarding communication of the network 102 (network circumstance information) are observed through the sending and receiving of packets performed between the RTCP unit 117 and the RTCP unit 137. Therefore, configurations of the transmission device 101 and the reception device 103 are the same as those in the first embodiment (FIG. 1) described above.

The measurement of the network circumstance information may be repeatedly performed during the data transmission, and the reception buffer time or the processing parameters may be updated according to the latest network circumstances.

In this case as well, the RTCP unit 117 and the RTCP unit 137 perform processes which are fundamentally the same as those in the case described in the first embodiment. However, in this case, the RTCP unit 117 transmits dummy data for network circumstance pre-measurement before starting transmission of encoded data. The dummy data is transmitted to the RTCP unit 137 via the network 102. The RTCP unit 137 receives the dummy data, and measures (pre-measures) network circumstances based on information when the transmission is performed and circumstances when the reception is performed, which are described in packets.

After starting transmission of the encoded data, the RTCP unit 137 measures the network circumstance information using RTP packets of the transmitted encoded data.

An example of the flow of the data transmission process in this case will be described with reference to the flowchart of FIG. 12. In step S221, in the same manner as step S121 in FIG. 7, when the reception buffer time setting unit 138 of the reception device 103 receives the image quality request and the transmission quality request, the RTCP unit 137 sends and receives various kinds of data such as dummy data to and from the RTCP unit 117 in step S222 so as to measure network circumstances, and shares the network circumstance information with the RTCP unit 117. In step S201, the RTCP unit 117 of the transmission device 101 performs a process corresponding to the process in step S222.

When the network circumstances are measured, the reception buffer time setting unit 138 of the reception device 103 performs the reception buffer time determining process. This process is performed fundamentally in the same manner as the case described with reference to the flowchart of FIG. 9.

However, the reception buffer time setting unit 138 calculates various kinds of request times based on not only the image quality request and the transmission quality request in step S141 but also the network circumstance information obtained from the RTCP unit 137 in step S222.

For example, if the packet loss rate is high, the "ARQ retransmitted packet waiting request time" is set to a value for improving the recovery performance. In addition, for example, if the packet loss rate is high, the "redundant encoding block reception waiting request time" is set to a value which satisfies Equation (3) and matches with the number of original data packets and the number of redundant packets which are maintained to be equal to or less than designated redundancy.

In addition, the "network jitter handling buffer request time" is set to a value equal to or more than actually measured network jitter.

As above, various kinds of delay times, waiting times, or the like are set according to the request times which have been set. The reception buffer time and processing parameter setting unit 119 of the transmission device 101 performs the reception buffer time and processing parameter setting process in step S202. This process is performed fundamentally in the same manner as the case described with reference to the flowchart of FIG. 11.

In other words, the reception buffer time and processing parameter setting unit 119 determines the redundancy or the FEC block size using the network circumstance information obtained by the RTCP unit 117 as well. Before starting transmission of the encoded data, the reception buffer time and processing parameter setting unit 119 determines the number of original data packets k or the number of redundant packets n-k so as to satisfy Equation (3) using the packet loss rate p included in network circumstance pre-measurement information measured by the RTCP unit 117.

When the setting of various kinds of parameters is completed, the respective units of the reception device 103 perform a reception buffer dynamic changing transmission process in which various kinds of settings such as the reception buffer time is dynamically updated and data is transmitted in step S224. In order to correspond to this process, the respective units of the transmission device 101 perform the reception buffer dynamic changing transmission process in step S203.

Reception Buffer Dynamic Changing Transmission Process

Figure 13:
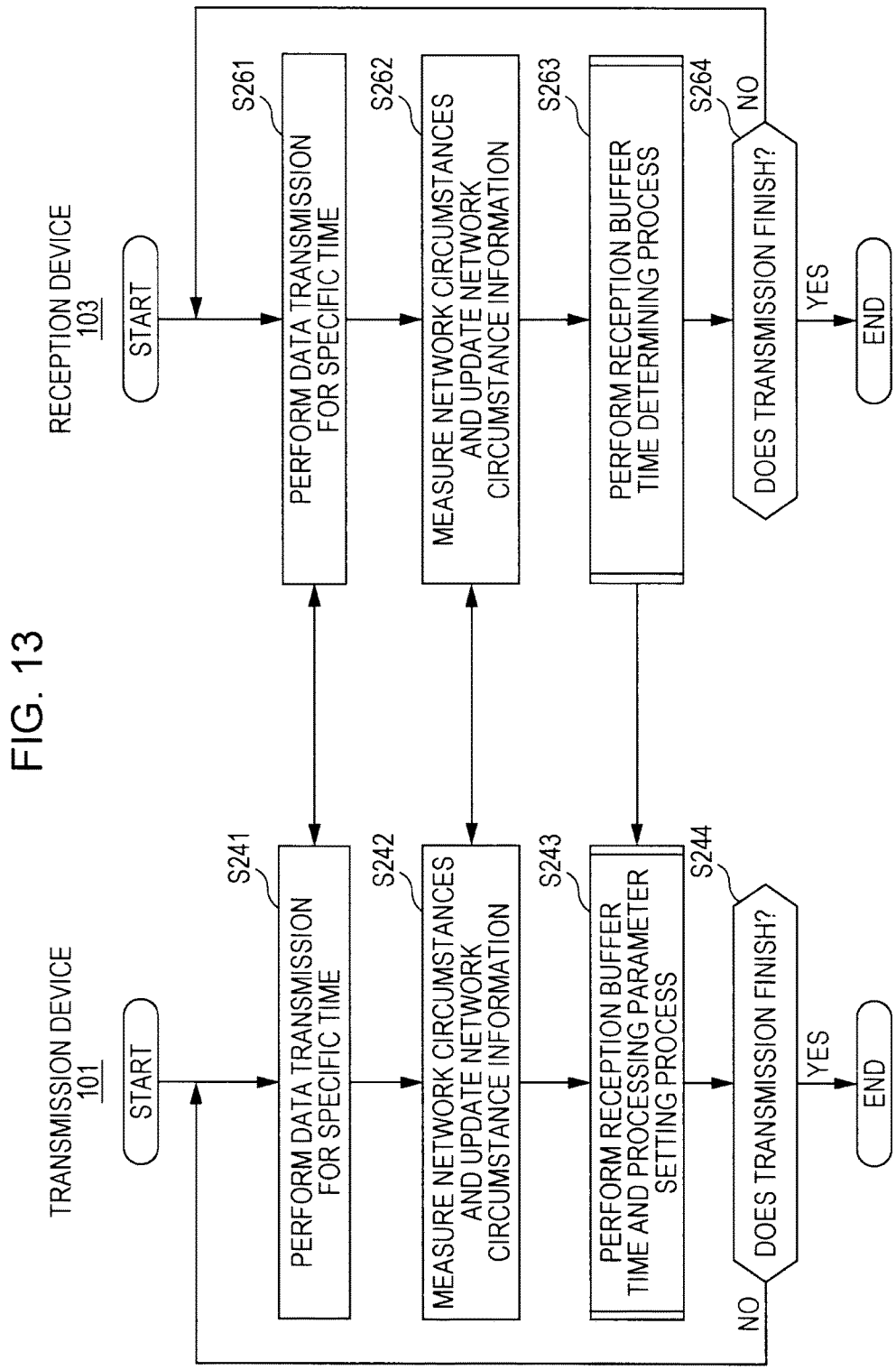
FIG. 13 is a flowchart illustrating an example of a flow of a reception buffer dynamic changing transmission process.

Referring to the flowchart of FIG. 13, an example of the flow of the reception buffer dynamic changing transmission process performed by the transmission device 101 and the reception device 103 will be described.

In step S241, the respective units of the transmission device 101 transmit data for a specific time. In order to correspond to this process, the respective units of the reception device 103 transmit data for a specific time in step S261.

The RTCP unit 137 of the reception device 103 transmits and receives data to and from the RTCP unit 117 in step S262 so as to measure network circumstances and updates the network circumstance information. In order to correspond to this process, the RTCP unit 117 of the transmission device 101 measures network circumstances and updates the network circumstance information in step S242.

In step S263, the reception buffer time setting unit 138 of the reception device 103 performs the reception buffer time determining process based on the updated network circumstance information, so as to update the "variable compression encoding delay request time", the "redundant encoding block reception waiting request time", the "ARQ retransmitted packet waiting request time", and, the "network jitter handling buffer request time", and, according to the various kinds of updated request times, updates the settings such as the "variable compression encoding delay time", the "redundant encoding block reception waiting time", the "ARQ retransmitted packet waiting time", and the "network jitter handling buffer time", using, for example, Equation (4) or (5).

Figure 12:
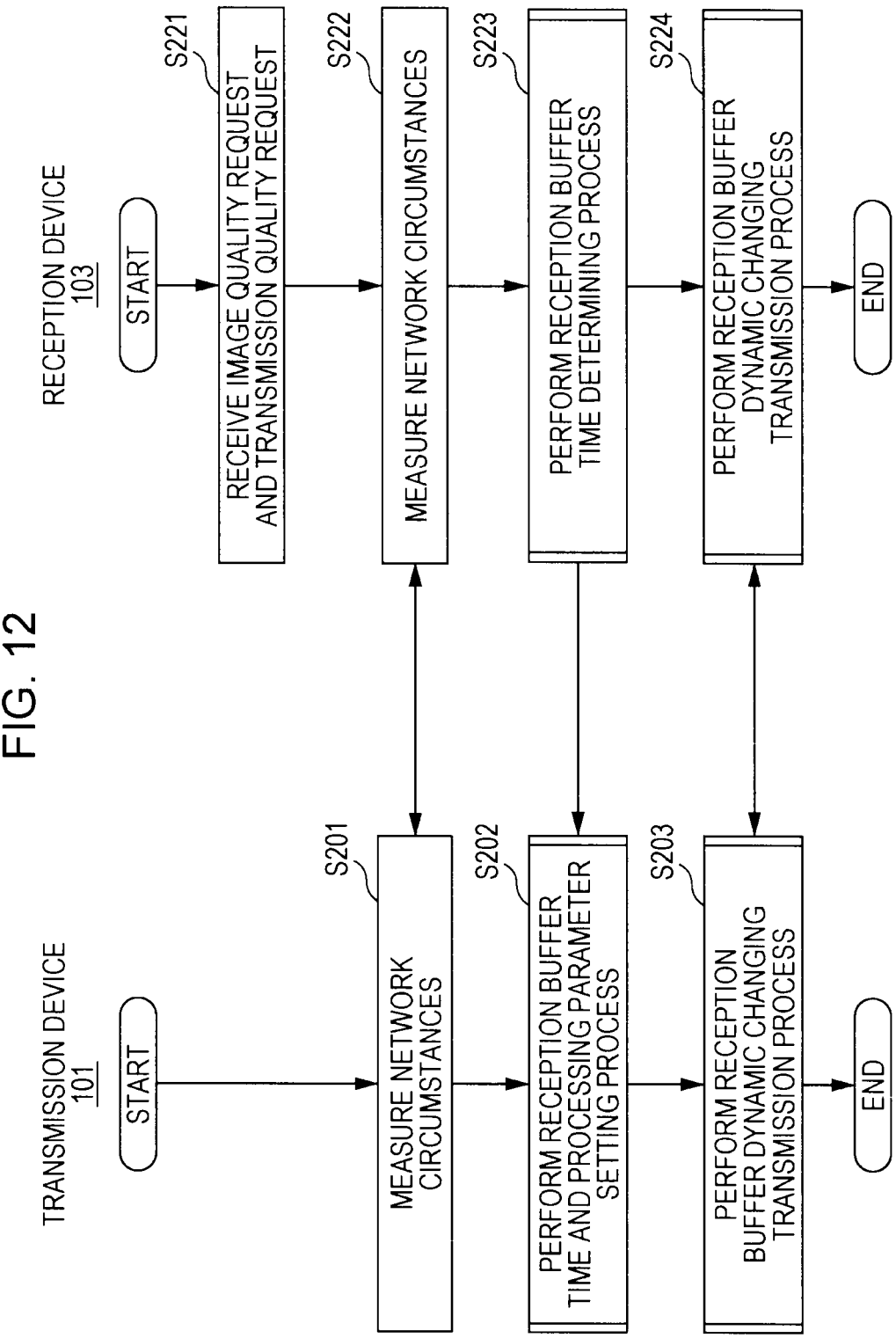
FIG. 12 is a flowchart illustrating another example of the data transmission process.

The reception buffer time determining process is performed in the same manner as the case of step S223 in FIG. 12.

In order to correspond to this process, in step S243, the reception buffer time and processing parameter setting unit 119 of the transmission device 101 performs the reception buffer time and processing parameter setting process. This process is performed in the same manner as the case of step S202 in FIG. 12.

After the encoded data starts being transmitted, the reception buffer time and processing parameter setting unit 119 determines the number of original data packets k or the number of redundant packets n-k so as to satisfy Equation (3) using the packet loss rate p included in the network circumstance information which is measured by the RTCP unit 117 using the encoded data transmission.

In step S244, the transmission device 101 determines whether or not the transmission finishes, and if it is determined that the transmission finishes, the flow returns to step S241 so as to perform the processes thereafter. In addition, in step S244, if it is determined that the transmission finishes, the reception buffer dynamic changing transmission process by the transmission device 101 finishes.

In step S264, the reception device 103 determines whether or not the transmission finishes, and if it is determined that the transmission finishes, the flow returns to step S261 so as to perform the processes thereafter. In addition, in step S264, if it is determined that the transmission finishes, the reception buffer dynamic changing transmission process by the reception device 103 finishes.

As described above, by performing the setting of parameters according to the network circumstances as well as the requests from a user or the like, the transmission device 101 and the reception device 103 can set image quality or transmission quality with higher efficiency according to more actual circumstances and can thus reduce wasted delay times. In other words, the transmission device 101 and the reception device 103 can suppress deterioration in the quality of content.

3. Third Embodiment

Configuration of Transmission System

In the above description, although the system in which the transmission device and the reception device are configured one to one has been described, the present disclosure is not limited thereto, but the number of transmission devices and reception devices forming the transmission system is arbitrary. For example, encoded data transmitted from a plurality of transmission devices may be received by a single reception device.

Figure 14:
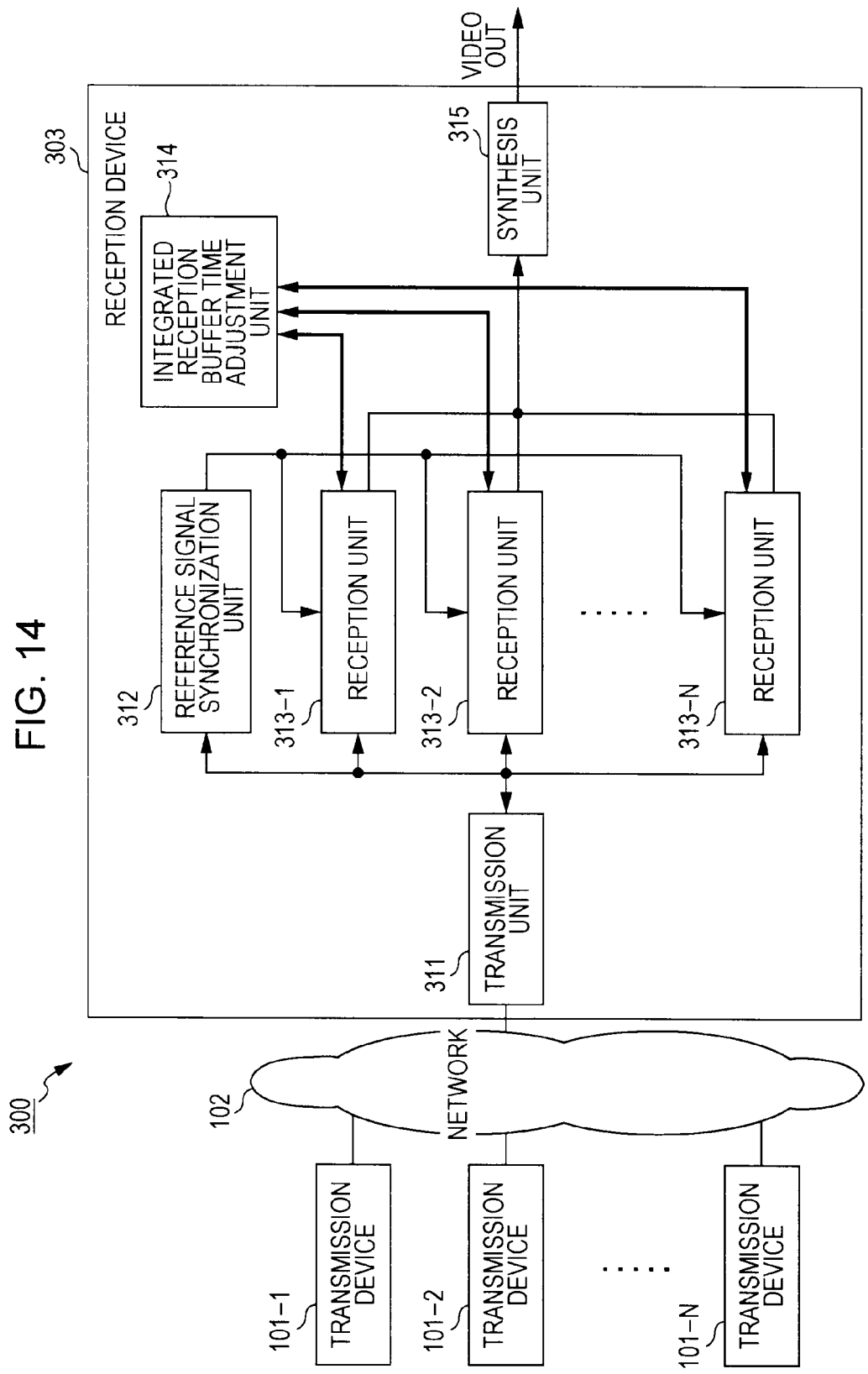
FIG. 14 is a block diagram illustrating a main configuration example of a transmission system according to another embodiment of the present disclosure.

FIG. 14 is a diagram illustrating a configuration example of a transmission system in that case. A transmission system 300 shown in FIG. 14 is basically the same as the transmission system 100, but, includes a plurality of transmission devices (a transmission device 101-1 to a transmission device 101-N (where N is an integer equal to or more than 2)) unlike the case of the transmission system 100.

The transmission device 101-1 to the transmission device 101-N respectively have the same configuration as the above-described transmission device 101 and perform the same processes. If description is made without differentiating the transmission device 101-1 to the transmission device 101-N from each other, they are simply referred to as transmission devices 101.

The transmission system 300 includes a single reception device 303 which receives RTP packets transmitted from each of the transmission devices 101 instead of the reception device 103.

As shown in FIG. 14, the reception device 303 includes a transmission unit 311, a reference signal synchronization unit 312, reception units 313-1 to 313-N, an integrated reception buffer time adjustment unit 314, and a synthesis unit 315.

The transmission unit 311 transmits information supplied from the reference signal synchronization unit 312 or the reception units 313-1 to 313-N, or receives information supplied from each of the transmission devices 101 and supplies the information to the reference signal synchronization unit 312 or the reception units 313-1 to 313-N, through communication with each of the transmission devices 101.

The reference signal synchronization unit 312 performs synchronization for a reference signal through communication with the reference signal synchronization unit 115 of each of the transmission devices 101. The synchronized reference signal is supplied to the reception units 313-1 to 313-N.

As above, when the transmission devices 101 exist in plurality, for example, the reference signal synchronization unit 312 of the reception device 303, which is used as a master, synchronizes all the transmission devices 101 with the reception device 303, and, as a result, all the transmission devices 101 can be synchronized with the reception device 303.

The reception units 313-1 to 313-N respectively correspond to the transmission device 101-1 to the transmission device 101-N, receive RTP packets supplied from the corresponding transmission devices 101, and output video data through decoding. Hereinafter, if description is made without differentiating the reception units 313-1 to 313-N from each other, they are simply referred to as reception units 313. That is to say, the reception units 313 equal to or more than the number of the transmission devices 101 are prepared in advance. In other words, the reception device 303 can receive packets transmitted from the transmission devices 101 equal to or less than the number of the embedded reception units 313.

The integrated reception buffer time adjustment unit 314 aligns reception buffer times in the respective reception units 313. The synthesis unit 315 synthesizes video data output from the respective reception units 313, and outputs the synthesized video data from the video output terminal "VIDEO OUT" of the reception device 303.

Reception Unit

Figure 15:
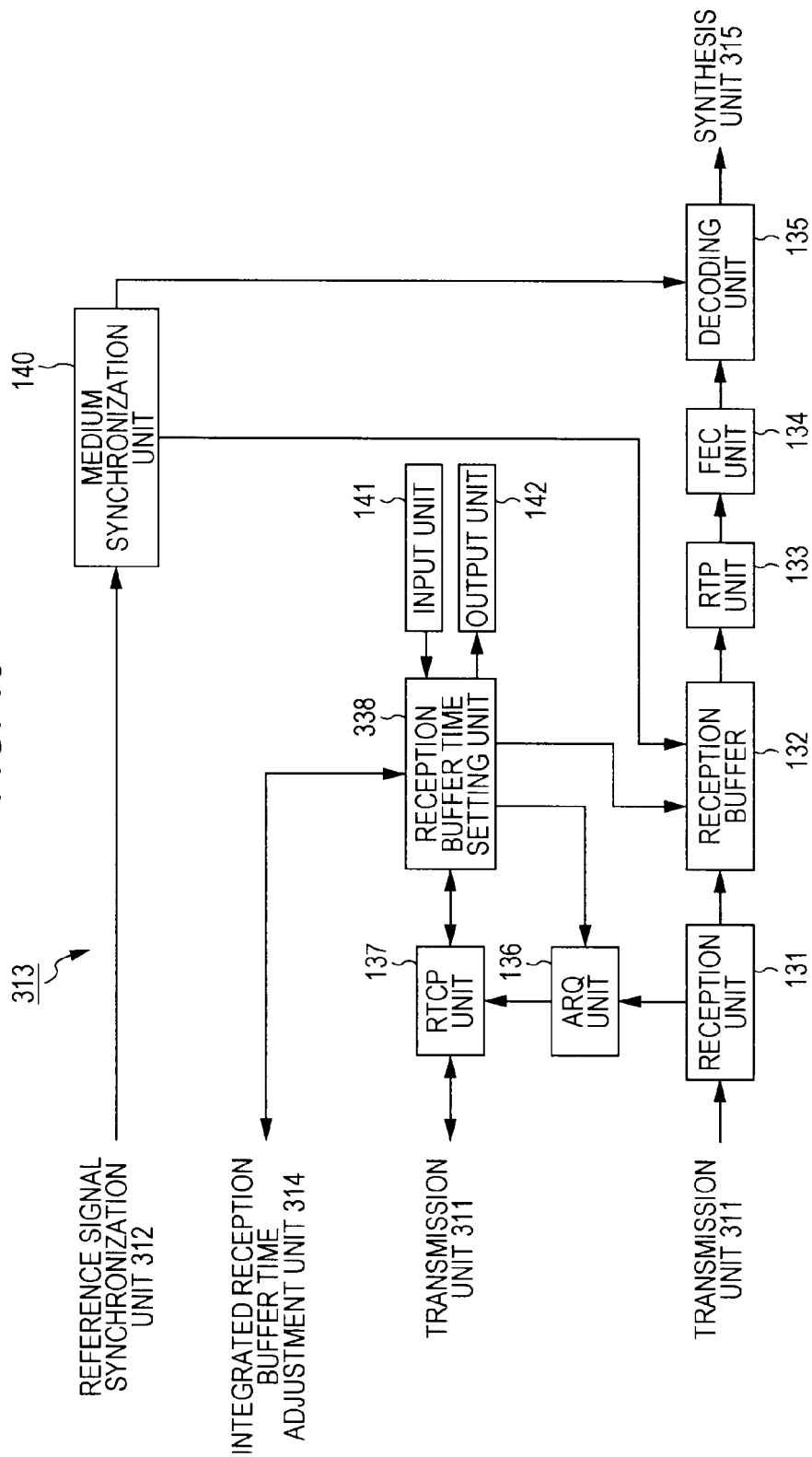
FIG. 15 is a block diagram illustrating a main configuration example of a reception unit.

FIG. 15 is a block diagram illustrating a main configuration example of the reception unit 313. As shown in FIG. 15, the reception unit 313 basically has the same configuration as the above-described reception device 103. However, the reception unit 313 does not have the reference signal synchronization unit 139 which the reception device 103 has. In addition, the reception unit 313 has a reception buffer time setting unit 338 instead of the reception buffer time setting unit 138 which the reception device 103 has.

The medium synchronization unit 140 controls process timings of RTP packets in the reception buffer 132 or the decoding unit 135 using a reference signal supplied from the external reference signal synchronization unit 312 of the reception unit 313, that is, a reference signal synchronized in the respective transmission devices 101 and the respective reception units 313.

The reception buffer time setting unit 338 sets various kinds of times or parameters based on an image quality request or a transmission quality request set by a user or the like, and network circumstance information or the like collected by the RTCP unit 137, in the same manner as the reception buffer time setting unit 138.

In addition, the various kinds of times set by the reception buffer time setting unit 338 are adjusted between the reception units 313 by the integrated reception buffer time adjustment unit 314 as described later.

The input unit 141 and the output unit 142 may be shared by the respective reception units 313. For example, even if a user inputs the image quality request or the transmission quality request to any reception unit 313, the same input unit 141 and the output unit 142 may be used. A changing control method of the reception units 313 in which the image quality request or the transmission quality request is set is arbitrary. For example, a button for the changing may be provided on a GUI. In addition, the user may set the image quality request or the transmission quality request in the plurality of reception units 313 at one time.

Overall Data Transmission Processes

With reference to the flowchart of FIG. 16, an example of the flow of the data transmission process in this case will be described.

In step S321, the reception buffer time setting unit 338 of each reception unit 313 of the reception device 303 receives the image quality request or the transmission quality request. In step S322, the RTCP unit 137 of each reception unit 313 of the reception device 303 communicates with the RTCP unit 117 of each transmission device 101 corresponding to each reception unit 313 so as to measure network circumstances, and generates network circumstance information.

In order to correspond to this process, the RTCP unit 117 of each transmission device 101 measures network circumstances and obtains network circumstance information.

In step S323, based on the information, the reception buffer time setting unit 338 of each reception unit 313 of the reception device 303 performs a temporary reception buffer time determining process for temporarily setting a reception buffer time.

When the temporary reception buffer time is determined in each reception unit 313, in step S324, the integrated reception buffer time adjustment unit 314 and the reception buffer time setting unit 338 of each reception unit 313 perform an integrated reception buffer time determining process in cooperation with each other and set a reception buffer time obtained by adjusting each temporary reception buffer time.

In step S325, the transmission unit 311 notifies each of the transmission devices 101 of the various kinds of information (for example, the image quality request, the transmission quality request, the variable compression encoding delay time, the redundant encoding block reception waiting time, and the like) obtained through the above-described processes. In step S302, each of the transmission devices 101 receives the notification and performs a reception buffer time and processing parameter setting process.

In steps S303 and S326, each of the transmission devices 101 and the reception device 303 perform a reception buffer dynamic changing process so as to measure the latest network circumstances, and transmit data while updating various kinds of settings based on the circumstances.

In the above description, although the case where the reception buffer time is set based on the image quality request, the transmission quality request, and the network circumstances has been described, the present disclosure is not limited thereto, but the reception buffer time may be set only based on the image quality request and the transmission quality request as in the first embodiment. In this case, the process in step S322 or S301 is omitted.

Temporary Reception Buffer Time Determining Process

Figure 17:
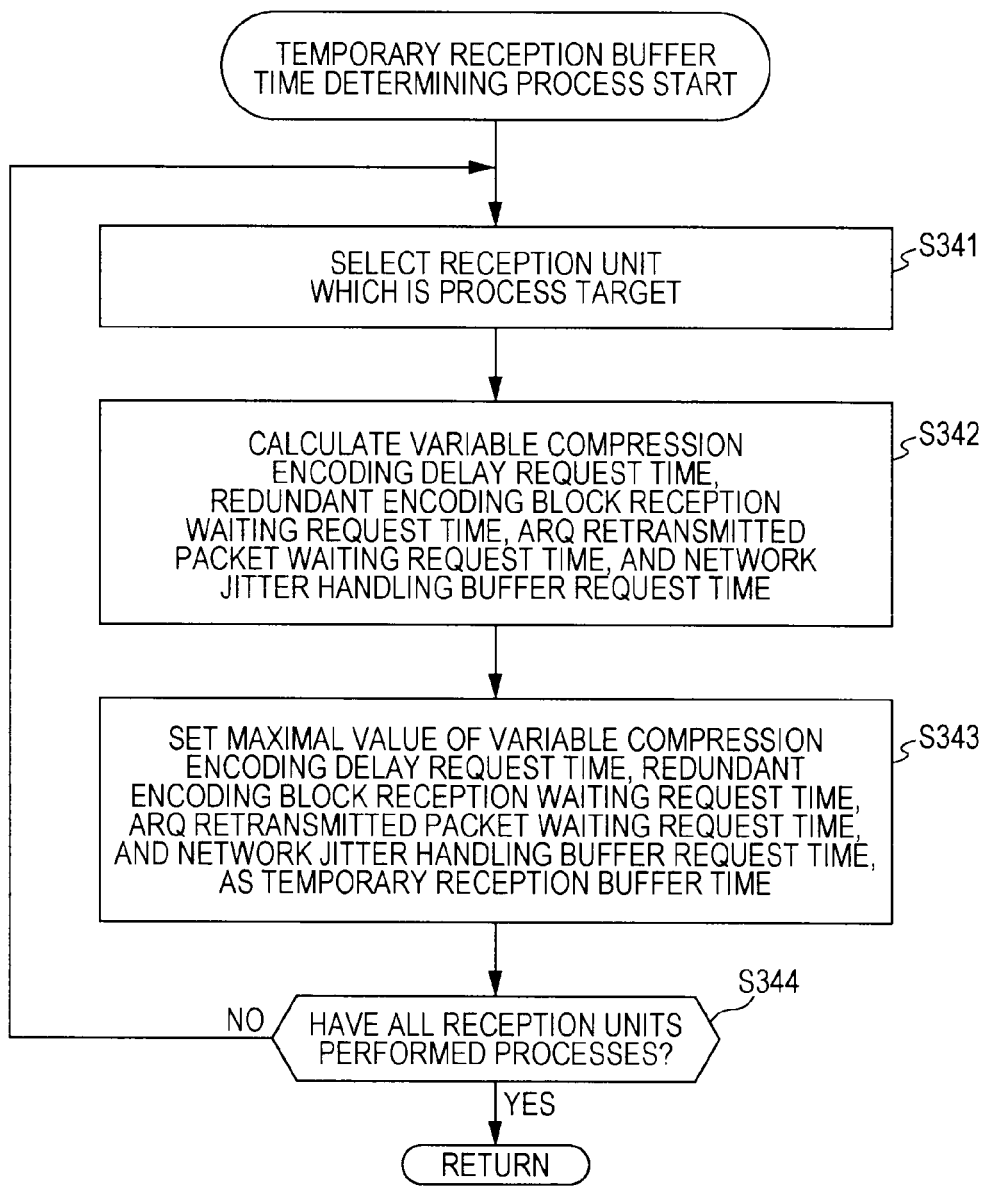
FIG. 17 is a flowchart illustrating an example of a flow of a temporary reception buffer time determining process.

Next, with reference to the flowchart of FIG. 17, an example of the flow of the temporary reception buffer time determining process will be described.

In step S341, the reception device 303 selects the reception unit 313, which is a process target of the reception units 313 which have not performed processes, of the reception units 313 used to transmit data in order to correspond to the transmission device 101. In step S342, the reception buffer time setting unit 338 of the reception unit 313 which is the process target calculates the "variable compression encoding delay request time", the "redundant encoding block reception waiting request time", the "ARQ retransmitted packet waiting request time", and, the "network jitter handling buffer request time", based on the image quality request, the transmission quality request, the network circumstance information, and the like.

In addition, in step S343, the reception buffer time setting unit 338 sets the maximal value of the "variable compression encoding delay request time", the "redundant encoding block reception waiting request time", the "ARQ retransmitted packet waiting request time", and, the "network jitter handling buffer request time", as the temporary reception buffer time.

In step S344, the reception device 303 determines whether or not all the reception units 313 have performed processes, and if it is determined that the reception units 313 which have not performed processes exist, the flow returns to step S341 where a new reception unit 313 is selected as a process target and the processes thereafter are repeatedly performed.

Figure 16:
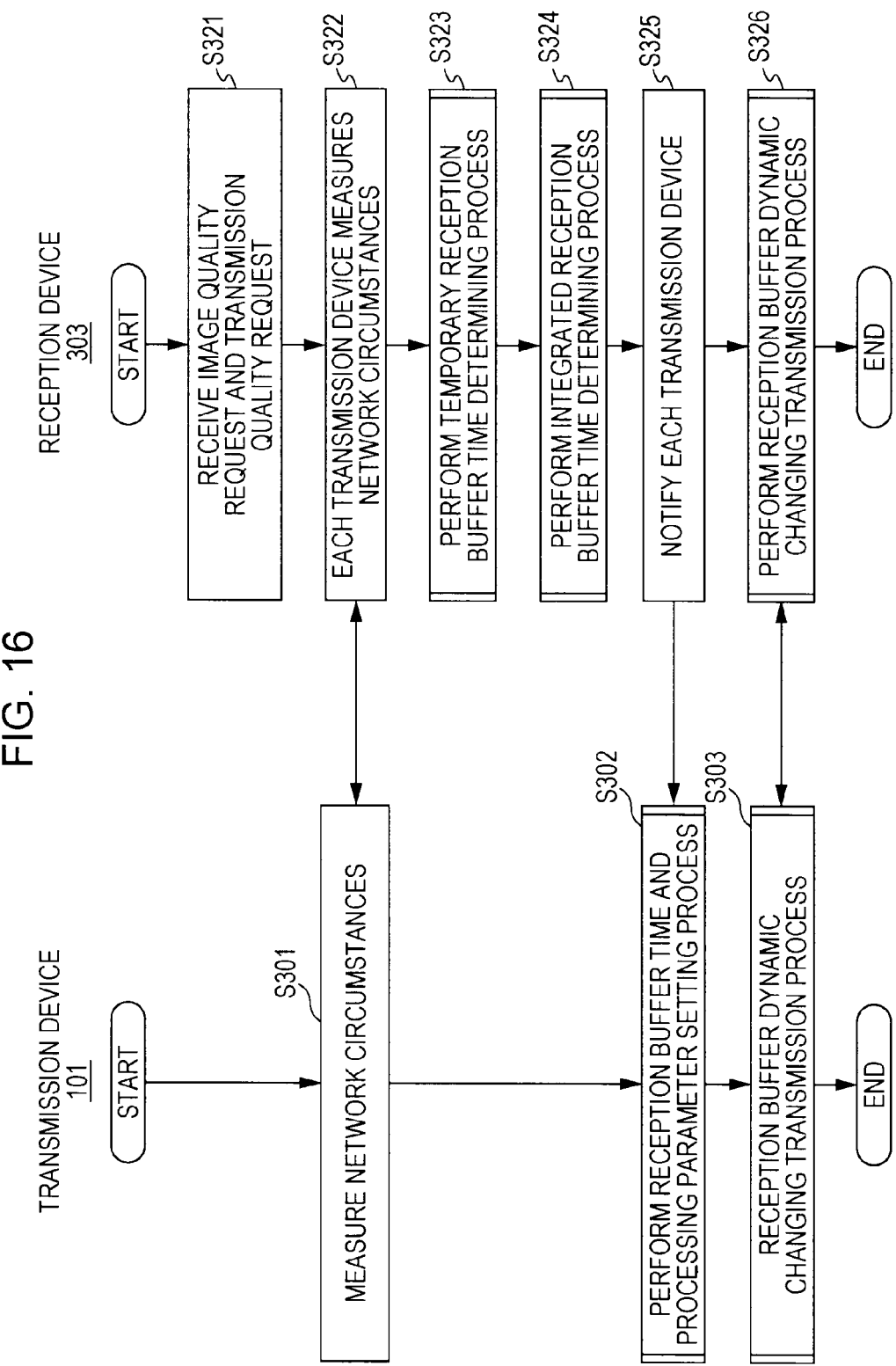
FIG. 16 is a flowchart illustrating still another example of a flow of the data transmission process.

In step S344, it is determined that all the reception units 313 used to transmit data have performed processes, the reception device 303 finishes the temporary reception buffer time determining process, and the flow returns to step S323 in FIG. 16 so as to perform the process in step S324.

Integrated Reception Buffer Time Determining Process

Figure 18:
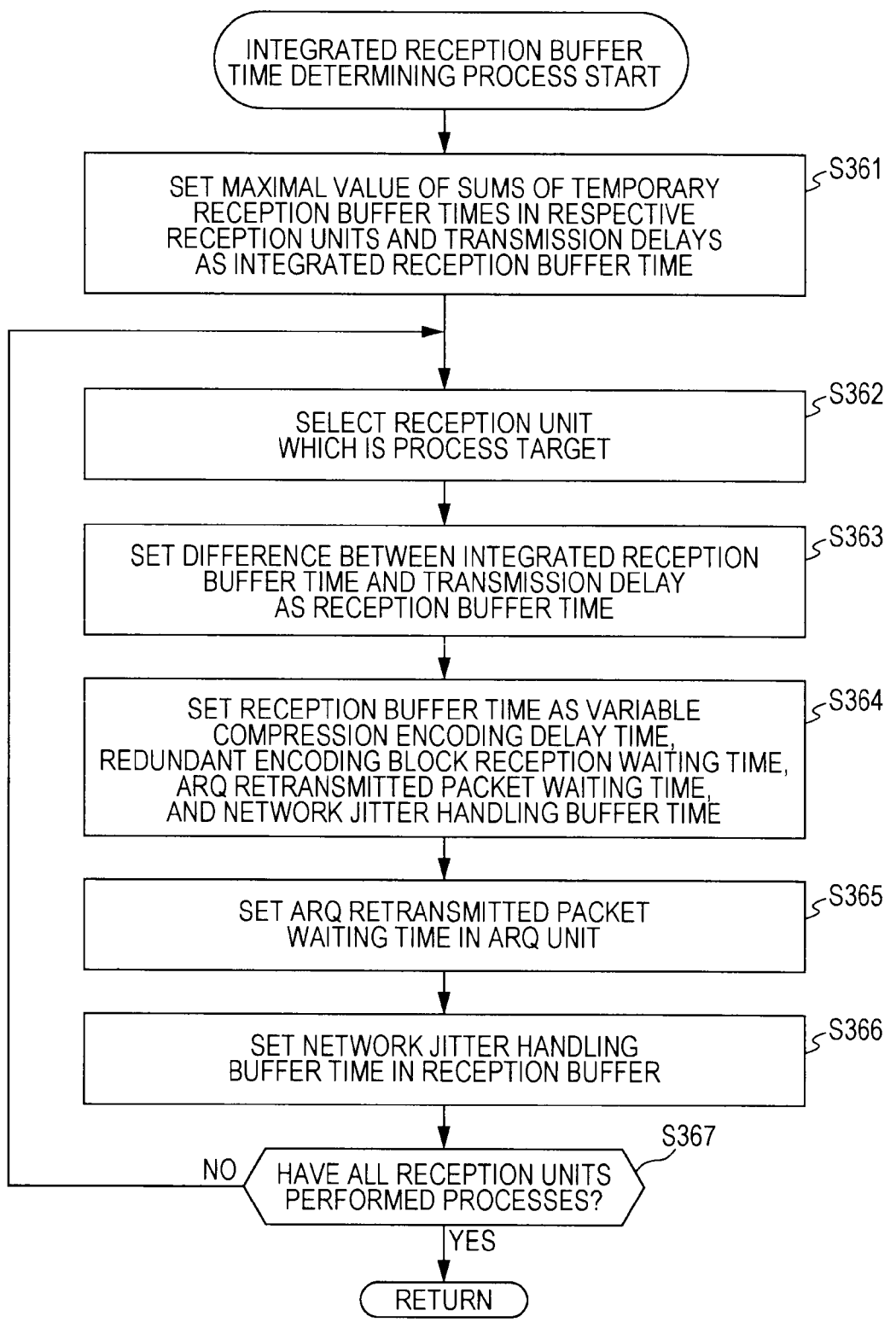
FIG. 18 is a flowchart illustrating an example of a flow of an integrated reception buffer time determining process.

Next, an example of the flow of the integrated reception buffer time determining process performed in step S324 in FIG. 16 will be described with reference to the flowchart of FIG. 18.

In step S361, the integrated reception buffer time adjustment unit 314 obtains the temporary reception buffer times set in the respective reception units 313, and requests the respective reception units 313 to obtain the sums of the temporary reception buffer times and the transmission delays as shown in the following Equation (7), thereby setting the maximal value of the sums as the integrated reception buffer time.

$$\text{Integrated reception buffer time} = \text{MAX}(\text{temporary reception buffer time 1} + \text{transmission delay time 1}, \text{temporary reception buffer time 2} + \text{transmission delay time 2}, \ldots, \text{temporary reception buffer time N} + \text{transmission delay time N}) \quad (7)$$

Figure 19:
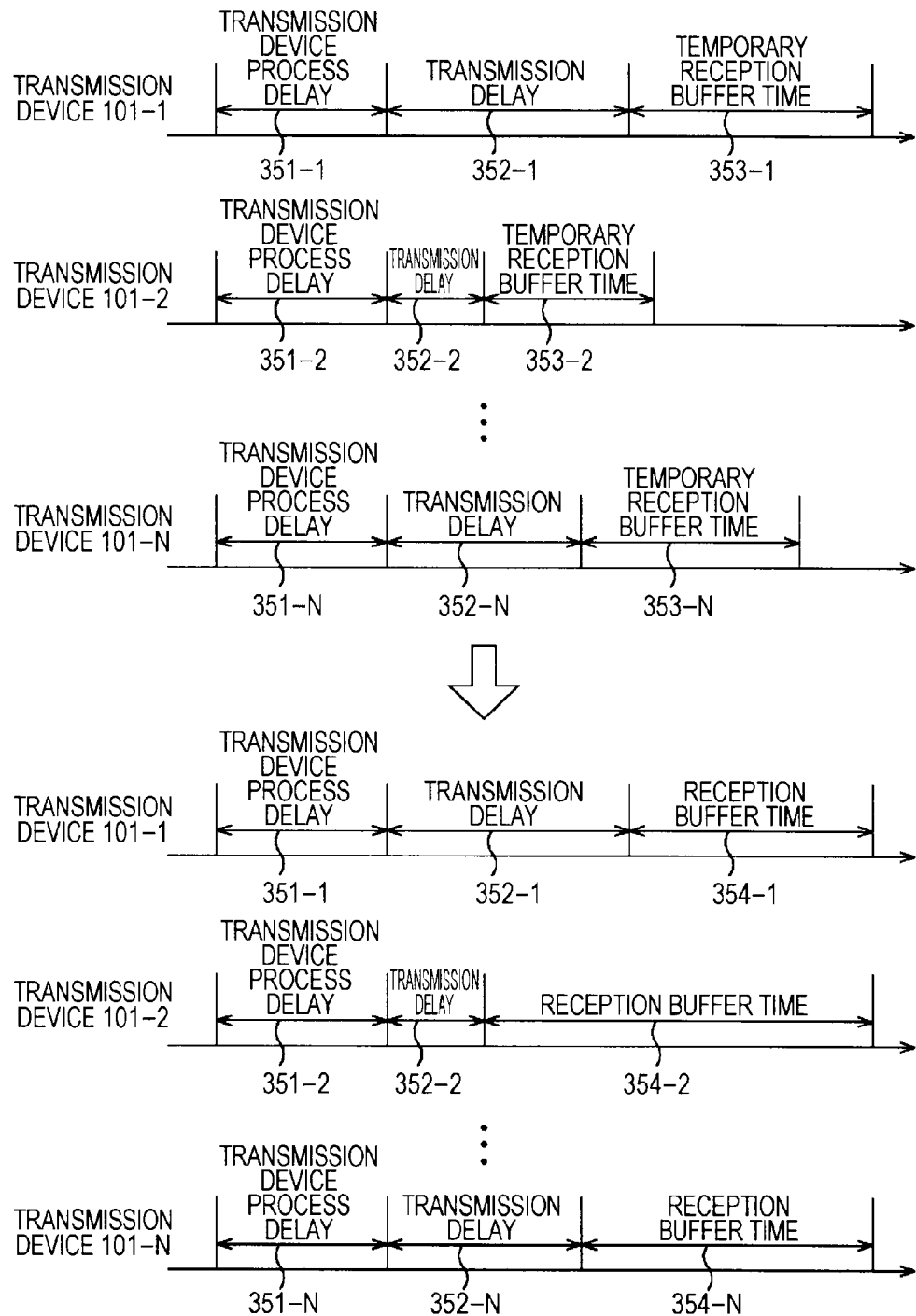
FIG. 19 is a diagram illustrating an example of a case of setting a reception buffer time.

For example, as shown in the upper side of FIG. 19, delay times caused by processes performed in the transmission devices 101 are denoted by transmission device process delays 351, delay times caused by the data transmission via the network 102 are denoted by transmission delays 352, and temporary reception buffer times set in the reception device 303 are denoted by temporary reception buffer times 353.

As shown in the upper part of FIG. 19, the transmission device process delay 351 of the transmission device 101-1 is denoted by a transmission device process delay 351-1, the transmission delay 352 of the transmission device 101-1 is denoted by a transmission delay 352-1, and the temporary reception buffer time 353 of the transmission device 101-1 is denoted by a temporary reception buffer time 353-1.

In addition, the transmission device process delay 351 of the transmission device 101-2 is denoted by a transmission device process delay 351-2, the transmission delay 352 of the transmission device 101-2 is denoted by a transmission delay 352-2, and the temporary reception buffer time 353 of the transmission device 101-2 is denoted by a temporary reception buffer time 353-2.

Hereinafter, this is also the same for the respective transmission devices 101, the transmission device process delay 351 of the transmission device 101-N is denoted by a transmission device process delay 351-N, the transmission delay 352 of the transmission device 101-N is denoted by a transmission delay 352-N, and the temporary reception buffer time 353 of the transmission device 101-N is denoted by a temporary reception buffer time 353-N.

For convenience of description, the transmission device process delay 351-1 to the transmission device process delay 351-N have the same length.

In this case, the sum for the transmission device 101-1 is the maximum of the sums of the temporary reception buffer times and the transmission delays, and thus the sum is set as the integrated reception buffer time.

Referring to FIG. 18 again, in step S362, the integrated reception buffer time adjustment unit 314 selects the reception unit 313 which is a process target of the reception units 313 which have not performed processes, of the reception units 313 used to transmit data, in order to correspond to several transmission devices 101.

In step S363, the reception buffer time setting unit 338 of the reception unit 313 selected as the process target sets a difference between the integrated reception buffer time set in step S361 and the transmission delay as the reception buffer time, as shown in the following Equation (8).

$$\text{Reception buffer time } K = \text{integrated reception buffer time} - \text{transmission delay } K \quad (8)$$

In the case of the example shown in FIG. 19, since the sum of the transmission delay 352-1 and the temporary reception buffer time 353-1 for the transmission device 101-1 is the maximum, the reception buffer time 354-1 of the transmission device 101-1 is set to be the same as the temporary reception buffer time 353-1 as shown in the lower side of FIG. 19, according to Equations (7) and (8).

The reception buffer time 354-2 of the transmission device 101-2 to the reception buffer time 354-N of the transmission device 101-N are respectively calculated to be the same. As a result, as shown in the lower side of FIG. 19, the sums of the transmission device process delays 351, the transmission delays 352, and the reception buffer times 354 for the respective transmission devices 101 are the same as each other.

In other words, the reception buffer times 354 of the respective transmission devices 101 are set to be longer to an extent that delays are not increased.

Referring to FIG. 18 again, in step S364, the reception buffer time setting unit 338 of the reception unit 313 which is the process target, as in Equation (5), sets the reception buffer time set in step S363 as the variable compression encoding delay time, the redundant encoding block reception waiting time, the ARQ retransmitted packet waiting time, and the network jitter handling buffer time.

Thereby, the respective delay times or waiting times are set to be longer to an extent that delays are not increased.

In step S365, the reception buffer time setting unit 338 sets the ARQ retransmitted packet waiting time in the ARQ unit 136. In step S366, the reception buffer time setting unit 338 sets the network jitter handling buffer time in the reception buffer 132.

In step S367, the reception device 303 determines whether or not all the reception units 313 have performed processes, and if it is determined that the reception units 313 which have not performed processes exist, the flow returns to step S362 where the new reception unit 313 which has not performed processes is selected, and the selected reception unit 313 repeatedly performs the processes thereafter.

In step S367, it is determined that all the reception units 313 used to transmit data have performed the processes, the reception device 303 finishes the integrated reception buffer time determining process, and the flow returns to step S324 in FIG. 16 so as to perform the processes after step S325.

In addition, the reception buffer time and processing parameter setting process by the respective transmission devices 101, which is performed in step S302 in FIG. 16, is performed in the same manner as the case described with reference to the flowchart of FIG. 11.

Reception Buffer Dynamic Changing Transmission Process

Figure 20:
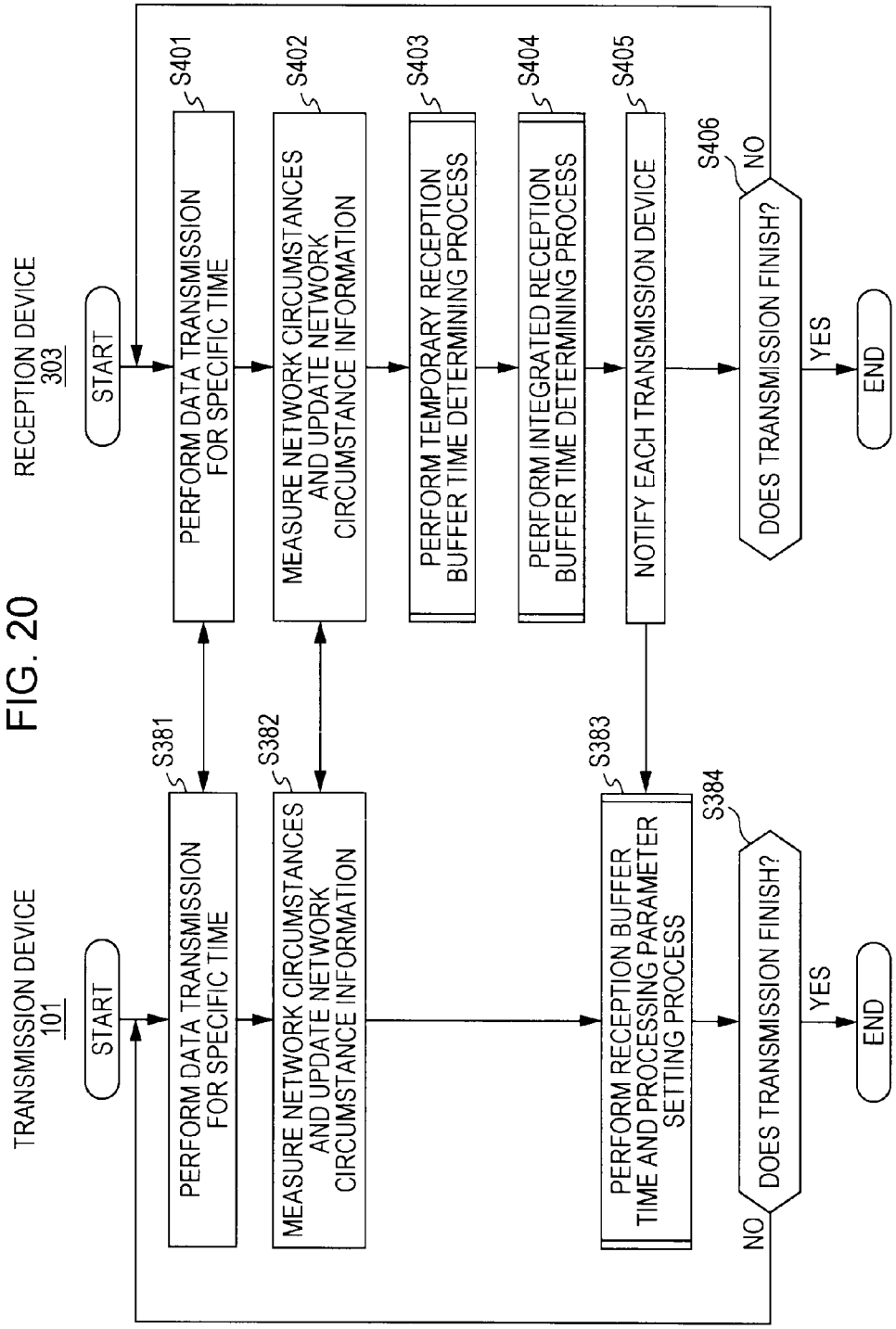
FIG. 20 is a flowchart illustrating another example of a flow of the reception buffer dynamic changing transmission process.

Next, an example of the flow of the reception buffer dynamic changing transmission process performed in steps S303 and S326 in FIG. 16 will be described with reference to the flowchart of FIG. 20.

In addition, the reception buffer dynamic changing transmission process is performed between each of the transmission devices 101 and the reception unit 313 corresponding thereto.

Although this case is performed basically in the same manner as the case described with reference to FIG. 13, in the case of the example shown in FIG. 13, the reception device 103 performs the reception buffer time determining process in step S263, whereas in the case of the example shown in FIG. 20, the reception device 303 (the reception units 313) performs the temporary reception buffer time determining process in step S403, performs the integrated reception buffer time determining process in step S404, and notifies the corresponding transmission device 101 of various kinds of information (for example, the image quality request, the transmission quality request, the variable compression encoding delay time, the redundant encoding block reception waiting time, and the like) obtained through the above-described processes in step S405.

In other words, the processes in steps S323 to S325 in FIG. 16, that is, the same processes as before starting the data transmission are performed.

In this way, the transmission device 101 and the reception device 303 update various kinds of settings based on the latest network circumstances in the same manner as the second embodiment, and thereby it is possible to reduce wasted delay times by efficiently using extra times in the respective processes to improve image quality or transmission quality. In other words, it is possible to suppress deterioration in the quality of content.

In a case where various kinds of settings are performed only based on a request from a user or the like, the reception buffer dynamic changing transmission process is omitted.

As described above, the transmission system 100 and the transmission system 300 align the delay times or the waiting times set in the reception device with the maximal value thereof with regard to each process for the data transmission, so as to give extra time to each process to an extent that a delay time is not increased, and sets parameters for each process so as to improve image quality or transmission quality using the extra time.

In this way, the transmission system 100 and the transmission system 300 can suppress deterioration in the quality of content.

For example, by efficiently using the reception buffer time determined by the image quality request, the transmission quality request from a user or the like, the network circumstance information, and the like, it is possible to improve video quality or transmission quality to the maximum without increasing delay times.

In addition, in a case where the variable compression encoding delay time is the maximal value of process delay times, and this value is set as the reception buffer time, a redundant encoding block in the redundant encoding process is increased, and the redundant encoding block reception waiting time is increased to be the same as the reception buffer time, thereby improving burst loss resistance without increasing delay times.

Further, the ARQ retransmitted packet waiting request time and the network jitter handling buffer request time are also increased in this way, and thereby it is possible to improve loss recovery performance or network jitter allowable values, respectively.

In addition, in a case where the redundant encoding block reception waiting time is the maximal value of the process delay times, the variable compression encoding delay time is increased to be same as the reception buffer time, and thereby it is possible to improve image quality without increasing delay times.

In a case where transmission from a plurality of transmission devices is processed to be synchronized in a reception device, a reception buffer time is adjusted such that plural pieces of encoded data can be processed to be synchronized, and processing parameters are adjusted such that an actual compressing encoding and decoding process time or a QoS control process time is equal to or less than the reception buffer time according to the adjusted reception buffer time. Thereby, it is possible to improve video quality or transmission quality to the maximum without increasing delay times by efficiently using the reception buffer time which is set to be equal to or more than the time designated by the image quality request, the transmission quality request from a user, the network circumstance information, and the like, which are set for the synchronization process of the plural pieces of encoded data.

In addition, in the above description, although the case where transmitted video data is encoded has been described, the present disclosure is not limited thereto, but the video data may be transmitted in a non-compression state.

4. Fourth Embodiment

Personal Computer

The above-described series of processes may be performed by hardware or software. In this case, for example, as shown in FIG. 21, there may be a configuration of a personal computer.

Figure 21:
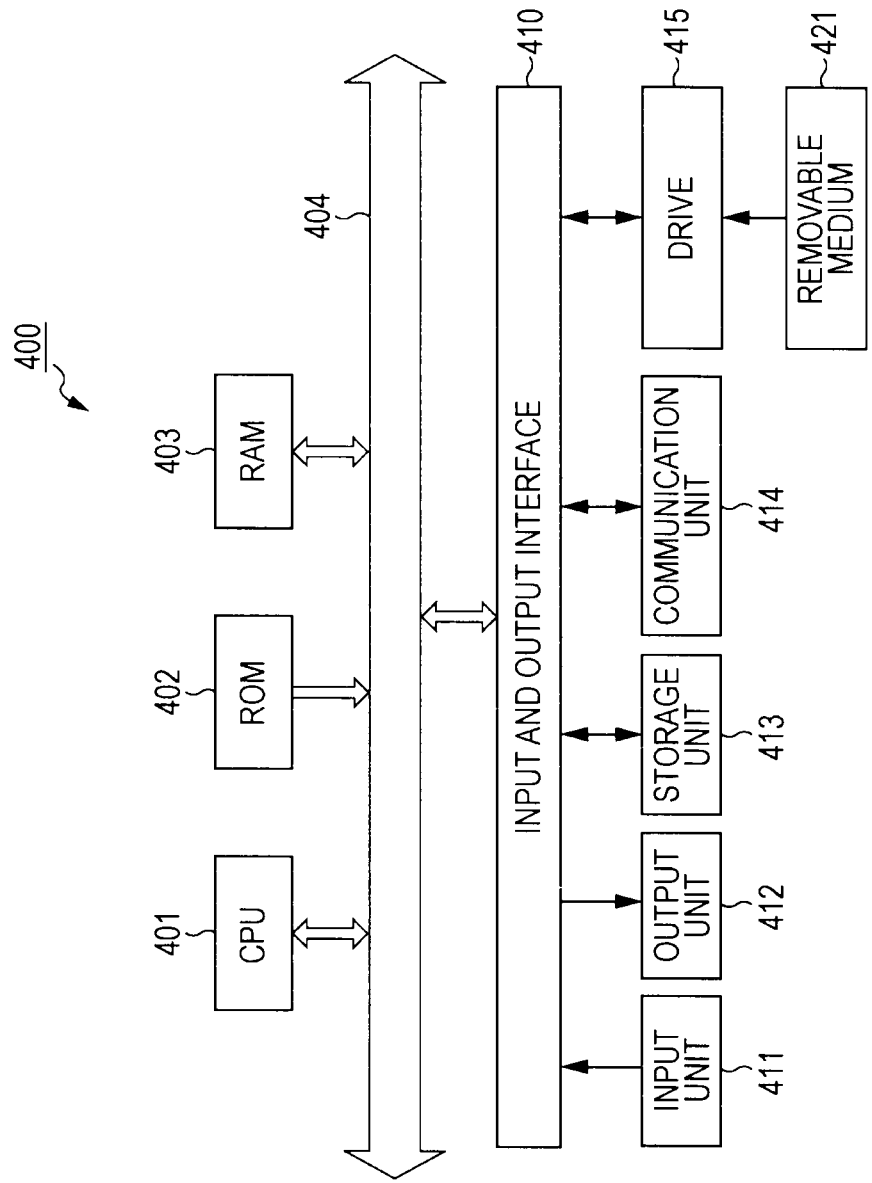
FIG. 21 is a block diagram illustrating a main configuration example of a personal computer according to an embodiment of the present disclosure.

In FIG. 21, a CPU (Central Processing Unit) 401 of the personal computer 400 performs various kinds of processes according to a program stored in a ROM (Read Only Memory) 402 or a program loaded from a storage unit 413 to a RAM (Random Access Memory) 403. The RAM 403 appropriately stores data or the like necessary for the CPU 401 to perform various kinds of processes.

The CPU 401, the ROM 402, and the RAM 403 are connected to each other via a bus 404. The bus 404 is also connected to an input and output interface 410.

The input and output interface 410 is connected to an input unit 411 constituted by a keyboard, a mouse, or the like, an output unit 412 constituted by a display including a CRT (Cathode Ray Tube) or an LCD (Liquid Crystal Display), a speaker, and the like, the storage unit 413 constituted by a hard disk or the like, and a communication unit 414 constituted by a modem or the like. The communication unit 414 performs communication via a network including the Internet.

A drive 415 is optionally connected to the input and output interface 410 and appropriately mounts thereon a removable medium 421 such as a magnetic disk, an optical disc, a magnetic optical disk, or a semiconductor memory, and programs or data read therefrom are installed in the storage unit 413 as necessary.

When the above-described series of processes is performed by the software, programs constituting the software are installed from a network or recording media.

The recording media include, for example, as shown in FIG. 21, the removable medium 421 such as a magnetic disk (including a flexible disc), an optical disc (including a CD-ROM (compact disc-read only memory) and DVD (digital versatile disc)), a magnetooptical disc (including an MD (mini disc)), or a semiconductor memory which stores programs, and are distributed separately from the device main body, in order to deliver the programs to a user, and further includes the ROM 402 or a hard disk included in the storage unit 413, which stores programs delivered to a user, in a state of being embedded in the main body.

The program executed by the computer may be a program where processes are performed in a time series according to the order described in this specification, or may be a program executed in parallel therewith or a program where processes are performed at a necessary timing such as when accessed.

Further, in this specification, the steps for describing programs recorded in a recording medium include not only processes performed in a time series according to the described order, but also processes performed in parallel or separately even if not necessarily performed in the time series.

In this specification, the system indicates the entire device configured by a plurality of devices.

In the above description, a configuration described using a single device (or a processing unit) may be constituted by a plurality of devices (or processing units). On the other hand, configurations described using a plurality of devices (or processing units) may be integrally constituted by a single device (or a processing unit). In addition, configurations other than the configurations described above may be added to the configuration of each device (or a processing unit). Further, if a configuration or an operation as an entire system is substantially the same, a portion of a configuration of a certain device (or a processing unit) may be included in a configuration of another device (or another processing unit).

The present disclosure contains subject matter related to that disclosed in Japanese Priority Patent Application JP 2010-180945 filed in the Japan Patent Office on Aug. 12, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
   a memory; and
   one or more processors coupled to the memory, the one or more processors are configured to:
      set a plurality of values of a plurality of delay times,
         wherein a first value of a first delay time of the plurality of delay times is maximum among the plurality of values of the plurality of delay times;
      update a second value of a second delay time of the plurality of delay times to the first value,
         wherein prior to the update of the second value, the second value of the second delay time corresponds to a third value, and
         wherein the first value is greater than the third value;
      notify, a transmitting device, a corresponding value of each of at least two delay times of the plurality of delay times,
         wherein the at least two delay times include a variable compression encoding delay time and a redundant encoding block reception waiting time,
         wherein the variable compression encoding delay time corresponds to a delay in transmission of data through a smoothing process, and
         wherein the data is generated through a rate control in an encoding process of the data; and
      transmit the data based on at least one of the first value of the first delay time, the updated second value of the second delay time, or the corresponding value of each of the at least two delay times.

2. The information processing device according to claim 1, wherein the plurality of delay times corresponds to Quality of Service (QoS) control process request times for the transmission of the data.

3. The information processing device according to claim 2, wherein
   the redundant encoding block reception waiting time corresponds to a reception time period of a leading packet to an end packet of a redundant encoding block, the plurality of delay times includes a retransmitted packet waiting time to wait for retransmitted packets, and the plurality of delay times further includes a network jitter handling buffer time for absorption of network jitter.

4. The information processing device according to claim 3, wherein the one or more processors are further configured to:

set the corresponding value of each of the retransmitted packet waiting time and the network jitter handling buffer time equal to a delay time that corresponds to a maximum value among the Quality of Service (QoS) control process request times, wherein the maximum value is same as the first value; and update the corresponding value of the network jitter handling buffer time in the memory, wherein the memory is configured to temporarily hold the transmitted data.

5. The information processing device according to claim 3, wherein the one or more processors are further configured to set parameters for the QoS control process on a data transmission side based on a transmission quality request and the redundant encoding block reception waiting time, and the transmission quality request is associated with transmission quality in the transmission of the data.

6. The information processing device according to claim 3, wherein the data is encoded in a transmission source, the encoded data is transmitted to a transmission destination, the encoded data is decoded in the transmission destination, the one or more processors are further configured to set encoding parameters, based on an image quality request associated with image quality of the data, and the variable compression encoding delay request time, and the encoding parameters include a buffer size to encode the data.

7. The information processing device according to claim 1, wherein the one or more processors are further configured to:

receive an image quality request associated with image quality of the data, and a transmission quality request associated with transmission quality of transmission of the data; and set, based on the image quality request and the transmission quality request, delay request times as the plurality of delay times.

8. The information processing device according to claim 7, wherein the one or more processors are further configured to:

control a display device to display a graphical user interface (GUI); and receive an input corresponding to each of the image quality request and the transmission quality request based on the displayed GUI.

9. The information processing device according to claim 1, wherein, in the transmission of the data from a plurality of transmission devices to at least one reception device, the one or more processors are further configured to set the plurality of delay times for each of the plurality of transmission devices, and wherein lengths of the plurality of delay times are set such that the plurality of delay times in overall data transmission are aligned between the plurality of transmission devices.

10. A method, comprising:

in an information processing device:

setting a plurality of values of a plurality of delay times, wherein a first value of a first delay time of the plurality of delay times is maximum among the plurality of values of the plurality of delay times;

updating a second value of a second delay time of the plurality of delay times to the first value, wherein prior to the update of the second value, the second value of the second delay time corresponds to a third value, and wherein the first value is greater than the third value;

notifying, a transmitting device, a corresponding value of each of at least two delay times of the plurality of delay times, wherein the at least two delay times include a variable compression encoding delay time and a redundant encoding block reception waiting time, wherein the variable compression encoding delay time corresponds to a delay in transmission of data through a smoothing process, and wherein the data is generated through a rate control in an encoding process of the data; and transmitting the data based on at least one of the first value of the first delay time, the updated second value of the second delay time, or the corresponding value of each of the at least two delay times.

11. A non-transitory computer-readable medium having stored thereon computer-executable instructions which, when executed by a processor, cause the processor to execute operations, the operations comprising:

setting a plurality of values of a plurality of delay times, wherein a first value of a first delay time of the plurality of delay times is maximum among the plurality of values of the plurality of delay times;

updating a second value of a second delay time of the plurality of delay times to the first value, wherein prior to the update of the second value, the second value of the second delay time corresponds to a third value, and wherein the first value is greater than the third value;

notifying, a transmitting device, a corresponding value of each of at least two delay times of the plurality of delay times, wherein the at least two delay times include a variable compression encoding delay time and a redundant encoding block reception waiting time, wherein the variable compression encoding delay time corresponds to a delay in transmission of data through a smoothing process, and wherein the data is generated through a rate control in an encoding process of the data; and transmitting the data based on at least one of the first value of the first delay time, the updated second value of the second delay time, or the corresponding value of each of the at least two delay times.

12. The information processing device according to claim 1, wherein the one or more processors are further configured to control a display device to display network circumstance information, and the network circumstance information includes at least one of transmission delay information, packet loss rate information, or network jitter information.

* * * * *